US012676375B2

(12) United States Patent
Ishitobi

(10) Patent No.: US 12,676,375 B2
(45) Date of Patent: Jul. 7, 2026

(54) BATTERY CASE FOR ELECTRIC VEHICLES AND MANUFACTURING METHOD

(71) Applicant: Kobe Steel, Ltd., Kobe (JP)

(72) Inventor: Hideki Ishitobi, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 696 days.

(21) Appl. No.: 18/042,464

(22) PCT Filed: Aug. 3, 2021

(86) PCT No.: PCT/JP2021/028778
§ 371 (c)(1),
(2) Date: Feb. 22, 2023

(87) PCT Pub. No.: WO2022/049971
PCT Pub. Date: Mar. 10, 2022

(65) Prior Publication Data
US 2023/0327257 A1      Oct. 12, 2023

(30) Foreign Application Priority Data
Sep. 3, 2020      (JP) ................................. 2020-148477

(51) Int. Cl.
*H01M 50/224*      (2021.01)
*B60L 50/64*      (2019.01)
(Continued)

(52) U.S. Cl.
CPC ........... *H01M 50/224* (2021.01); *B60L 50/64* (2019.02); *H01M 10/613* (2015.04);
(Continued)

(58) Field of Classification Search
CPC ............. H01M 50/224; H01M 10/613; H01M 10/625; H01M 50/249; H01M 50/231; H01M 10/656; B60L 50/64
See application file for complete search history.

(56) References Cited

U.S. PATENT DOCUMENTS 6,720,032 B1 *    4/2004   Kuhm ................... C23C 22/184
                                                              427/388.5
2018/0233789 A1 *  8/2018   Iqbal ................. H01M 10/6556
(Continued)

FOREIGN PATENT DOCUMENTS

JP          3002875 U      10/1994
JP          10-255749 A     9/1998
(Continued)

OTHER PUBLICATIONS

The decision of JPO to grant a Patent for Application JP 2020148477 (Year: 2022).*
(Continued)

*Primary Examiner* — Alexander Usyatinsky
(74) *Attorney, Agent, or Firm* — Oblon, McClelland, Maier & Neustadt, L.L.P.

(57) ABSTRACT
A battery case for an electric vehicle includes a frame that has a polygonal frame shape in plan view, defines a through hole inside, and has R shapes provided on inner sides of corner parts of the polygonal frame shape. The case also includes a bathtub-shaped tray that includes a bottom wall located in the through hole, a surrounding wall that is provided around the bottom wall and defines an opening part on a side opposite to the bottom wall, and a flange that is provided at a distal end of the surrounding wall. The tray is pressure-welded to and integrated with the frame.

17 Claims, 19 Drawing Sheets

(51) Int. Cl.

| | | |
|---|---|---|
| *H01M 10/613* | (2014.01) | |
| *H01M 10/625* | (2014.01) | |
| *H01M 10/6556* | (2014.01) | |
| *H01M 50/231* | (2021.01) | |
| *H01M 50/249* | (2021.01) | |

(52) U.S. Cl.
CPC ..... *H01M 10/625* (2015.04); *H01M 10/6556* (2015.04); *H01M 50/231* (2021.01); *H01M 50/249* (2021.01); *H01M 2220/20* (2013.01)

(56) References Cited

U.S. PATENT DOCUMENTS

| | | | |
|---|---|---|---|
| 2018/0337377 A1* | 11/2018 | Stephens | H01M 50/224 |
| 2019/0381899 A1* | 12/2019 | Günther | B60L 50/64 |

FOREIGN PATENT DOCUMENTS

| | | | |
|---|---|---|---|
| JP | 2001-515959 A | 9/2001 | |
| JP | 2017-226353 A | 12/2017 | |
| WO | WO-2020060341 A1 * | 3/2020 | H01M 50/262 |

OTHER PUBLICATIONS

International Search Report issued Oct. 26, 2021 in PCT/JP2021/028778, filed on Aug. 3, 2021, 4 pages.
International Preliminary Report on Patentability and Written Opinion issued Mar. 16, 2023, in PCT/JP2021/028778 (with English Translation), 14 pages.

* cited by examiner

Fig. 10

BATTERY CASE FOR ELECTRIC VEHICLES AND MANUFACTURING METHOD

CROSS-REFERENCE TO RELATED APPLICATIONS

This is a national phase application in the United States of International Patent Application No. PCT/JP2021/028778 with an international filing date of Aug. 3, 2021, which claims priority of Japanese Patent Application No. 2020-148477 filed on Sep. 3, 2020 the contents of which are incorporated herein by reference.

TECHNICAL FIELD

The present invention relates to a battery case for an electric vehicle and a manufacturing method.

While an electric vehicle such as an electric car needs to be equipped with a large-capacity battery to secure a sufficient cruising distance, the electric vehicle is required to include a wide vehicle compartment. In order to meet these requests, in many electric cars, a large-capacity battery is stored in a battery case, and mounted on an entire surface below a floor of the vehicle. Therefore, the battery case for the electric vehicle is required to have a high sealing property for preventing water from entering from a road surface or the like, and preventing failures of electronic parts, and is also required to have high collision strength for protecting a battery inside.

For example, JP 2017-226353 A discloses a battery case whose sealing property is improved by using a tray obtained by molding a metal plate into a bathtub shape by cold press molding.

SUMMARY OF THE INVENTION

To perform cold press molding on the metal plate, the battery case of JP 2017-226353 A needs a mold draft angle (an inclination of a surrounding wall) and R shapes (round shapes) at ridge parts of a bottom wall and the surrounding wall or corner parts. Performing high-load press molding and making roundness of the corner parts smaller to secure a large space for mounting the battery cause a risk that the corner parts are cracked. Therefore, it is difficult to efficiently secure the space for mounting the battery. Furthermore, it is also necessary to weld the bathtub-shaped tray and a frame such as a longitudinal bone.

An object of the present invention is to realize a battery case for the electric vehicle and a manufacturing method thereof that secure a sufficient sealing property, improve space efficiency for mounting a battery, prevent cracking at a time of molding, and improve joining strength of a tray and a frame.

A first aspect of the present invention provides a battery case for an electric vehicle that includes: a frame that has a polygonal frame shape in plan view, defines a space inside, and has an R shape provided to an inner side of a corner part of the polygonal frame shape; and a tray of a bathtub shape that includes a bottom wall that is located in the space, a surrounding wall that is provided around the bottom wall and defines an opening part on a side opposite to the bottom wall, and a flange that is provided at a distal end of the surrounding wall, and is pressure-welded to and integrated with the frame.

According to this configuration, the tray is molded into the bathtub shape, so that there is no seam, and a high sealing property can be secured. Furthermore, the R shapes are provided to the corner parts of the frame, the tray is pressure-welded to the frame, and therefore the R shapes of the frame are provided to the tray, too. Consequently, it is possible to form the tray having the R shapes formed to match the R shapes of the corner parts of the frame. Consequently, it is possible to improve space efficiency for mounting the battery by setting the R shapes of the corner parts of the frame to a desired size. In a case where the R shapes are not provided to the corner parts of the frame, the R shapes of the corner parts of the tray are made significantly small by high-load press molding, and, as a result, there is a risk that a tray bottom surface part is cracked or a flange part is wrinkled. However, in a case where the R shapes are provided to the corner parts of the frame as in the above configuration, substantially the same R shapes as the R shapes of at least the corner parts of the frame are provided to the tray, so that it is possible to suppress the crack of the bottom surface part and the wrinkle of the flange part produced at a time of molding of the tray. Furthermore, the bathtub-shaped tray is pressure-welded to and thereby integrated with the frame, so that it is possible to realize highly accurate joining without causing thermal deformation accompanying fusion welding, that is, it is possible to improve the joining strength of the tray and the frame.

The frame may include a main body that forms the polygonal frame shape, and a corner member that has the R shape disposed on the inner side of the corner part of the main body.

According to this configuration, the frame includes the main body and the corner member as separate members, so that it is easy to freely set the R shapes of the corner parts of the frame.

The polygonal frame shape of the frame may be formed by welding a linear extruded material, and an end part of the extruded material may be subjected to press work so as to have the R shape.

According to this configuration, the R shapes are provided to the frame itself, so that it is not necessary to provide a part for providing the R shapes, and it is possible to reduce the number of components. Note that, even when the frame is welded, the tray is not welded, so that the sealing property is not impaired.

The frame may be composed of an extruded material made of an aluminum alloy, and the tray may be composed of a plate material made of an aluminum alloy. Furthermore, the frame may be composed of a steel plate roll forming material, and the tray may be composed of a plate material made of steel. Furthermore, the frame may be composed of a steel plate roll forming material that is subjected to an anti-corrosive coating, and the tray may be composed of a plate material made of an aluminum alloy. Furthermore, the frame may be composed of an extruded material made of an aluminum alloy, and the tray may be composed of a coated steel plate or a laminated steel plate.

According to these configurations, it is possible to specifically form the battery case for the electric vehicle by using components of various materials.

The frame may include a cross member.

According to this configuration, the cross member can improve strength of the battery case. Particularly, the cross member can improve strength against a collision from a side of the vehicle.

The tray includes a negative angle part that has a negative angle directed at least partially inward from the bottom wall toward the opening part of the tray.

According to this configuration, the negative angle part is formed in the tray, so that it is possible to suppress the pressure-welding from being released and the tray from coming out of the frame.

A flow path of a coolant may be molded in the bottom wall of the tray.

According to this configuration, it is possible to cool the battery by causing a coolant to flow through the flow path. The battery case having a high sealing property in particular causes heat dissipation performance to lower in some cases, and therefore is required to have high cooling performance.

A second aspect of the present invention provides a method for manufacturing a battery case for an electric vehicle that includes: preparing a frame and a molding target member having a flat plate shape, the frame including a main body that has a polygonal frame shape in plan view and defines a space inside, and a corner member that is disposed on an inner side of a corner part of the main body, and has an R shape; overlaying and disposing the molding target member on the frame; pressurizing the molding target member from a side opposite to the frame, pressing the molding target member against the frame, and bulging the molding target member in the space, thus deforming the molding target member into a tray of a bathtub shape, and integrating the molding target member with the frame, the tray including a bottom wall, and a surrounding wall that is provided at a circumferential edge of the bottom wall and defines an opening part; and detaching the corner member from the frame after the molding target member and the frame are integrated.

According to this method, the molding target member can be molded into the bathtub-shaped tray, so that there is no seam, and a high sealing property can be secured. Furthermore, the R shapes are provided to the corner parts of the frame, the tray is pressure-welded to the frame, and the same R shapes as the R shapes of the corner parts of the frame are provided to the tray. Consequently, the tray having the desired R shapes can be formed, so that it is possible to improve space efficiency for mounting the battery, and suppress cracking at a time of molding. Furthermore, the bathtub-shaped tray is pressure-welded to and thereby integrated with the frame, so that it is possible to realize highly accurate joining without causing thermal deformation accompanying fusion welding, that is, it is possible to improve the joining strength of the tray and the frame. Furthermore, it is possible to reduce a weight by detaching the corner members.

The molding target member may be pressurized by a rubber bulge method.

According to this method, the molding target member can be easily molded into the bathtub-shaped tray without being accompanied by thermal deformation. In this regard, the rubber bulge method is a pressure molding method that uses an elastic body. Specifically, the pressure molding method refers to a method for molding a member with a gas or liquid pressure. This method can use, for example, a device in which only a lower surface of a metal chamber containing a liquid such as water or oil is blocked with a rubber plate (elastic body).

In such a device, the rubber plate is elastically deformed by adjusting the liquid pressure, and the rubber plate is pressed against the molding target member and deformed. At this time, it is possible to perform molding without the liquid coming into direct contact with the molding target member.

The molding target member may be pressurized by the rubber bulge method in a state where the molding target member is heated and softened.

According to this method, the molding target member is softened, so that it is possible to further suppress cracking at a time of molding of the tray.

The method for manufacturing the battery case for the electric vehicle may further include: further preparing a restraining die having a height dimension equal to or larger than a height dimension of the frame and that restrains movement of the frame; fixing and disposing the restraining die on an outer side of the frame; supporting a first outer edge part of the molding target member by the frame, supporting a second outer edge part on an outer side of the first outer edge part by the restraining die, and thus deflecting and disposing the molding target member such that a height of the molding target member becomes lower from an outer side to an inner side in plan view; and pressurizing the molding target member in a state where the molding target member is deflected.

According to this method, by pressurizing the molding target member in a state where the molding target member is deflected such that the height becomes lower from the outer side toward the inner side, it is possible to increase an amount of a material flowing into the inside of the molding target member, and realize a shape formed by making the R shapes of a connection ridge part of the bottom wall and the surrounding wall or the corner parts of the bathtub-shaped tray smaller.

The molding target member may be pressurized at two stages, the molding target member may be molded into a bathtub shape at a first stage, and the frame and the molding target member may be pressure-welded and integrated at a second stage.

According to this method, pressurization of the molding target member is separated into two stages, and a position where a strain increases in the molding target member changes, so that it is possible to improve moldability as a whole. That is, it is possible to suppress cracking of the molding target member, and stably mold the tray.

According to the present invention, it is possible to realize a battery case for the electric vehicle and a manufacturing method thereof that secure a sufficient sealing property, improve space efficiency for mounting a battery, prevent cracking at a time of molding, and improve joining strength of a tray and a frame.

BRIEF DESCRIPTION OF THE DRAWINGS

FIG. 10 is a cross-sectional view illustrating a first modified example of negative angle forming;

MODE FOR CARRYING OUT THE INVENTION

Embodiments of the present invention will be described below with reference to the accompanying drawings.

First Embodiment

Figure 1:
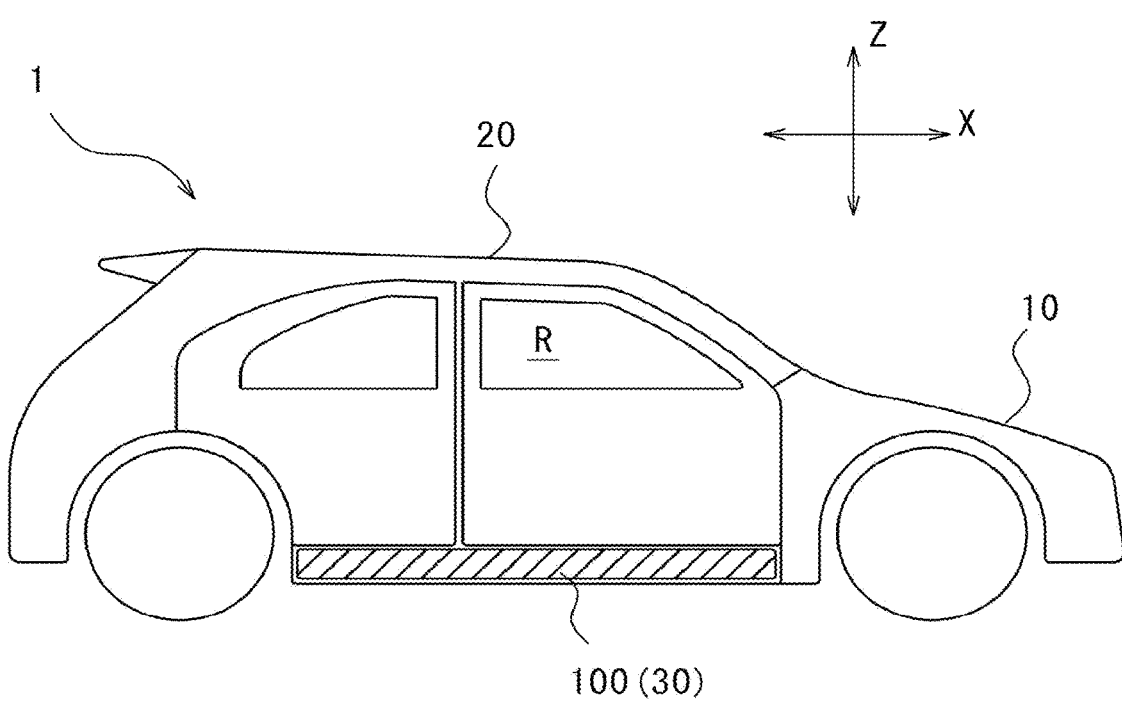
FIG. 1 is a side view of an electric car on which a battery case for an electric vehicle according to a first embodiment of the present invention is mounted.

Referring to FIG. 1, an electric vehicle 1 is a vehicle that runs by driving an unillustrated motor with electric power supplied from a battery 30. For example, the electric vehicle 1 may be an electric car, a plug-in hybrid car, or the like. Vehicle types are not limited in particular, and may be a passenger car, a truck, a work car, other mobile cars, or the like. Hereinafter, a case where the electric vehicle 1 is a passenger car type electric car will be described as an example.

The electric vehicle 1 includes an unillustrated motor, high-voltage equipment, and the like mounted on a vehicle body front part 10. Furthermore, the electric vehicle 1 includes a battery case 100 for the electric vehicle (referred to simply as the battery case 100 below) that is mounted thereon and stores the battery 30 in substantially an entire surface below a floor of a vehicle compartment R of a vehicle body center part 20. Note that, in FIG. 1, a front-rear direction of the electric vehicle 1 is indicated as an X direction, and a height direction is indicated as a Z direction. The same indications apply to the following drawings, too, and a vehicle width direction is indicated as a Y direction in FIG. 2 and subsequent drawings.

Figure 2:
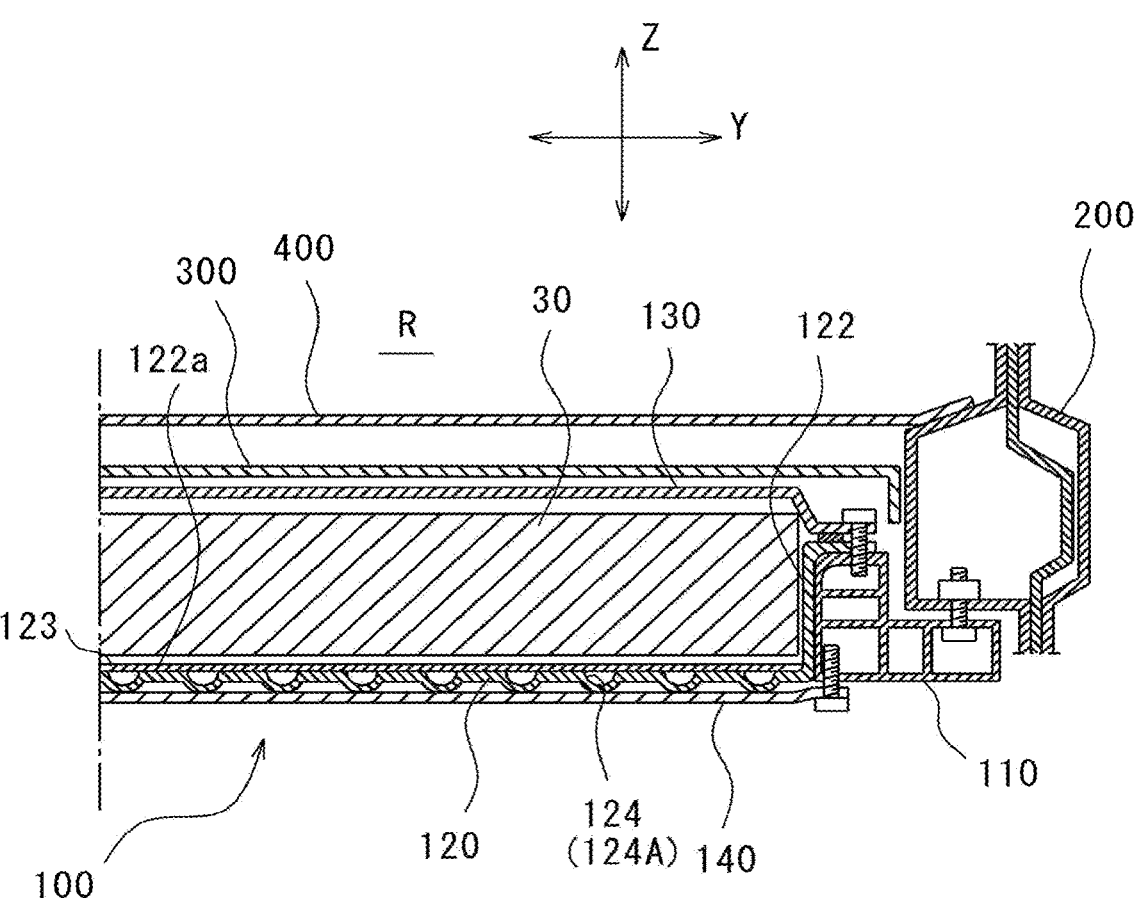
FIG. 2 is a schematic cross-sectional view of the battery case according to the first embodiment.

Referring to FIG. 2, the battery case 100 is disposed inside a rocker member 200 in the vehicle width direction, and is supported by the rocker member 200. The rocker member 200 is a framework member that extends in a vehicle front-rear direction at lower parts at both ends in the vehicle width direction of the electric vehicle 1 (see FIG. 1). The rocker member 200 is formed by joining a plurality of metal plates, and has a function of protecting the vehicle compartment R and the battery case 100 against an impact from a side of the electric vehicle 1.

Figure 3:
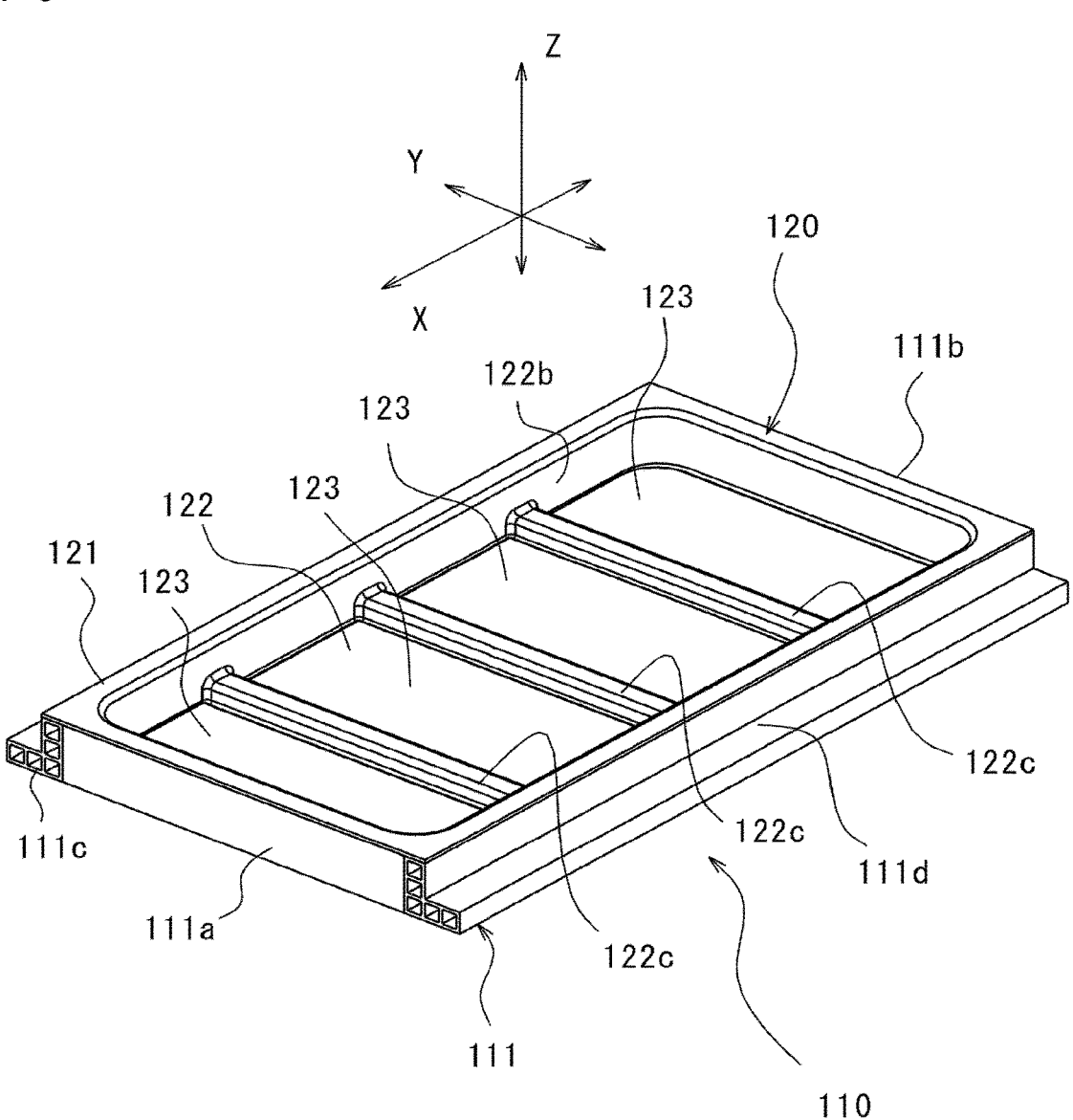
FIG. 3 is a perspective view of a tray, a frame, and a closing plate according to the first embodiment.
Figure 4:
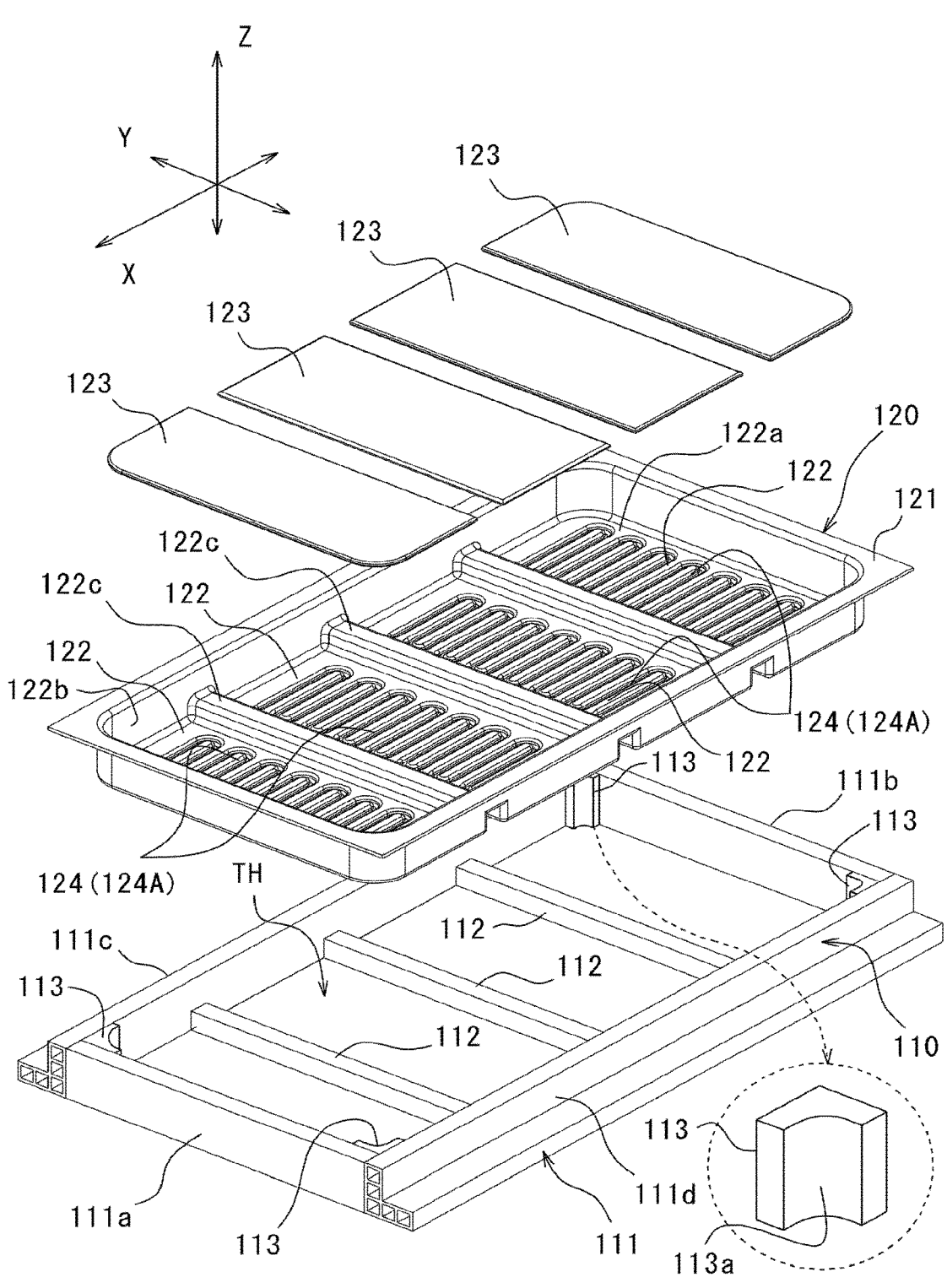
FIG. 4 is an exploded perspective view of the tray, the frame, and the closing plate according to the first embodiment.

Referring also to FIGS. 3 and 4, the battery case 100 includes a frame 110 that defines a through hole TH, a tray 120 of a bathtub shape, a top cover 130 (see FIG. 2) and an under cover 140 (see FIG. 2) that are disposed sandwiching the frame 110 and the tray 120 from above and below, and closing plates 123 that are disposed on bottom walls 122a of the tray 120. In this regard, the through hole TH is an example of a space in the present invention.

The frame 110 is a member that forms a framework of the battery case 100. The frame 110 includes a main body 111 that has a rectangular frame shape in plan view, three cross members 112 that extend in the vehicle width direction in the main body 111, and corner members 113 that are disposed on inner sides of four corner parts of the main body 111. Note that, although the present embodiment will describe the frame 110 including the through hole TH as an example, the shape of the frame 110 is not limited to a through-hole shape. For example, the frame 110 may have a recess shape instead of the through-hole shape, that is, may have a bottom wall.

The main body 111 includes sidewalls 111c and 111d that extend in the vehicle front-rear direction, and a front wall 111a and a rear wall 111b that connect the sidewalls 111c and 111d and extend in the vehicle width direction. The sidewalls 111c and 111d have substantially L-shapes in cross sections perpendicular to the vehicle front-rear direction. Insides of the sidewalls 111c and 111d are partitioned into a plurality of compartments to have hollow shapes. The front wall 111a and the rear wall 111b have square tubular shapes, and insides of the front wall 111a and the rear wall 111b also have hollow shapes likewise. The main body 111 is composed of, for example, an extruded material made of an aluminum alloy.

The three cross members 112 are provided at substantially equal intervals in parallel to the front wall 111a and the rear wall 111b, and connect the sidewall 111c and the sidewall 111d. The cross member 112 has a function of improving strength of the battery case 100. Particularly, the cross members 112 can improve the strength against collision from the side of the electric vehicle 1 (see FIG. 1). An aspect of the cross members 112 is not limited in particular, and a shape, arrangement, the number, and the like thereof can be arbitrarily set. Furthermore, the cross members 112 are not essential components, and may be omitted as necessary.

A broken line circle in FIG. 4 illustrates the enlarged corner member 113. Note that an arc-shaped part of the corner member 113 has a shoulder R shape (a fillet shape at a boundary between an upper surface and side surfaces), yet is not illustrated.

The corner member 113 has a substantially L shape in plan view, and has a columnar shape having a height similar to that of the frame 110. The R shape (round shape) is provided to an inner surface 113a of the corner member 113. In order to secure a large mounting space for the battery 30, a curvature of the R shape is preferably 30 mm or less in radius. Specifically, in a case where the height of the frame 110 (the length of the through hole TH in the Z direction) is 50 mm or less, the curvature of the R shape is preferably 15 mm or less. Furthermore, in a case where the height of the frame 110 is 100 mm or less, the curvature of the R shape is preferably 30 mm or less. By setting the dimensions in this way, it is possible to suppress cracking of the bottom surface part and a wrinkle of a flange part produced at a time of molding of the tray 120 while making the R shapes as small as possible and securing the large mounting space for the battery 30.

The corner members 113 may be attached to the main body 111 by an arbitrary method. For example, the corner members 113 may be attached to the main body 111 by screwing, or may be attached by detachable attachment mechanisms.

The tray 120 is a bathtub-shaped member that houses the battery 30. The tray 120 includes a flange 121 that extends in a horizontal direction (X-Y direction) at an outer edge part, and housing parts 122 that continue to the flange 121 and have recess shapes. The housing part 122 is a part that houses the battery 30, and includes the bottom wall 122a that forms a bottom surface, and a surrounding wall 122b that is provided around the bottom wall 122a and defines an opening part 122d on a side opposite to the bottom wall 122a. The tray 120 is composed of, for example, a plate material made of an aluminum alloy.

In plan view, the R shapes having substantially the same curvature as those of the corner members 113 of the frame 110 are provided to four corner parts of the surrounding wall 122b. In a state where the frame 110 and the tray 120 are integrated, the four corner parts of the surrounding wall 122b and the corner members 113 of the frame 110 are in contact without a gap.

The bottom wall 122a of the housing part 122 is provided with protrusion parts 122c having shapes fitting mutually with the cross members 112. The protrusion part 122c is a part at which the bottom wall 122a partially protrudes upward and extends in the vehicle width direction. In the respective bottom walls 122a of the housing part 122 partitioned by the protrusion parts 122c, grooves 124 through which coolants flow are respectively formed.

Each groove 124 is formed in a bellows shape in plan view. Each groove 124 includes one end provided with an inlet 124a into which the coolant flows, and the other end provided with an outlet 124b from which the coolant flows out. In the present embodiment in particular, the inlet 124a and the outlet 124b are provided for each housing parts 122 partitioned by the protrusion part 122c.

The closing plate 123 having a matching shape is disposed and joined from above onto each bottom wall 122a of the housing part 122 partitioned by the protrusion part 122c. The closing plate 123 closes the groove 124 to define a coolant flow path 124A through which the coolant flows.

The battery 30 (see FIG. 2) is disposed on the closing plates 123. The coolants flowing through the coolant flow paths 124A cool the battery 30 via the closing plates 123. The closing plate 123 may be an aluminum plate or the like having high thermal conductivity in order to improve cooling efficiency.

A joining method such as an adhesive or heat fusion (e.g., laser heat fusion) may be used to join the closing plates 123 to the tray 120. Preferably, Friction Stir Welding (FSW) is used. FSW is welding in a solid phase state, and does not produce a blow hole and has an excellent sealing property unlike normal welding. In order to improve the cooling performance, the thickness of the closing plate 123 may be, for example, 2 mm or less (e.g., approximately 1 mm).

In a state where the tray 120 and the frame 110 are combined (see FIG. 3), the flange 121 of the tray 120 is placed on an upper surface of the main body 111 of the frame 110, and the housing part 122 of the tray 120 is disposed in the main body 111 of the frame 110. In this regard, the protrusion parts 122c are disposed partially covering the cross members 112. Although FIG. 4 virtually illustrates an exploded view for the sake of description, the tray 120 is pressure-welded to the through hole TH of the frame 110 so as to be integrated with the frame 110 in a combined state as illustrated in FIG. 3. During this pressure welding, outer surfaces of the housing parts 122 of the tray 120 are pressure-welded to an inner surface of the main body 111 of the frame 110, and the protrusion parts 122c are pressure-welded to the cross members 112.

Referring again to FIG. 2, the battery 30 is disposed in the housing parts 122 of the tray 120. The housing parts 122 are sealed by the top cover 130 from above the battery 30 to store the battery 30 in the battery case 100. The sealing structure prevents water from entering from an outside of the battery case 100. Furthermore, a safety valve for pressure adjustment inside the battery case 100 may be provided.

In the example of FIG. 2, the top cover 130 and the tray 120 are tightened together by screws and fixed to the frame 110. A floor panel 300 that makes up a floor surface of the vehicle compartment R and a floor cross member 400 that extends in the vehicle width direction in the vehicle compartment R are disposed above the top cover 130. Furthermore, the under cover 140 is disposed below the tray 120. The under cover 140 is screwed to the frame 110, and supports the tray 120 from below.

A method for manufacturing the battery case 100 employing the above configuration will be described with reference to FIGS. 6 to 9.

Figure 6:
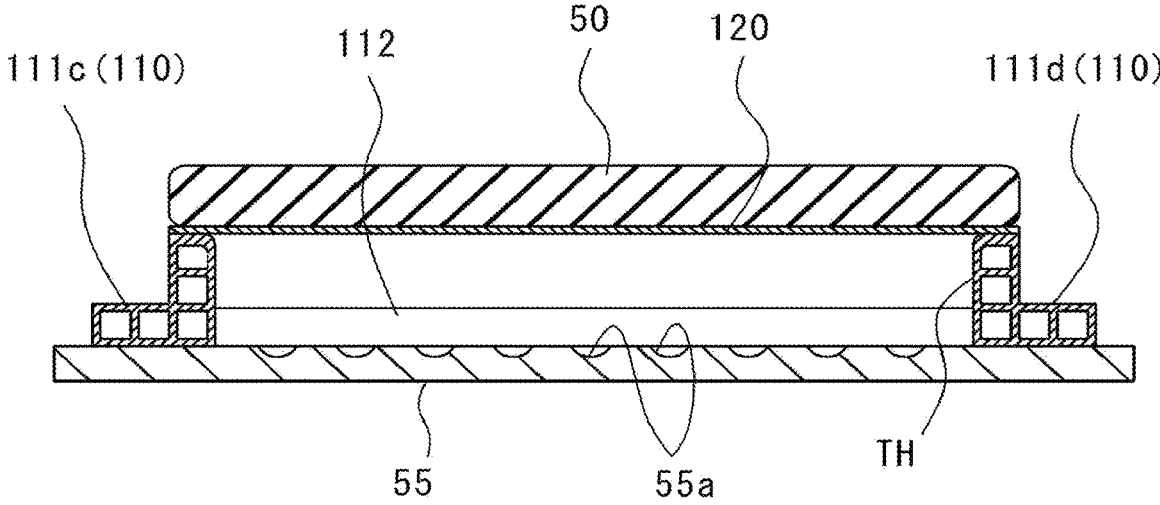
FIG. 6 is a first cross-sectional view illustrating a method for manufacturing the battery case according to the first embodiment.

Referring to FIG. 6, the frame 110 and the blank material (molding target member) 120 having a flat plate shape are prepared to overlay and dispose the frame 110 and the blank material 120 on a table 55. Recess parts 55a having shapes matching the grooves 124 are formed in an upper surface of the table 55 to mold the grooves 124 in the tray 120 as described later. Note that use of the same reference numeral 120 for the blank material and the tray means that a state before molding is the blank material and a state after molding is the tray.

Figure 7:
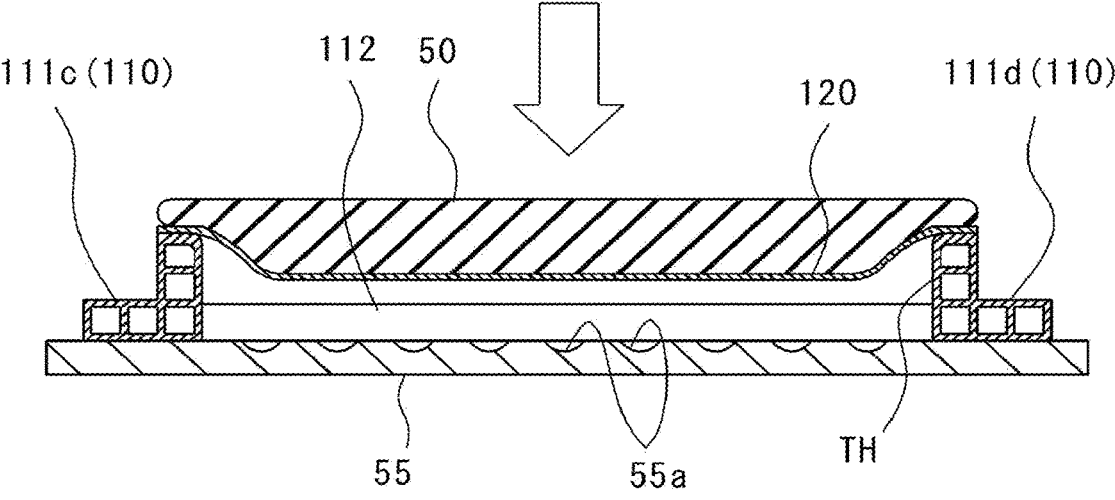
FIG. 7 is a second cross-sectional view illustrating the method for manufacturing the battery case according to the first embodiment.
Figure 8:
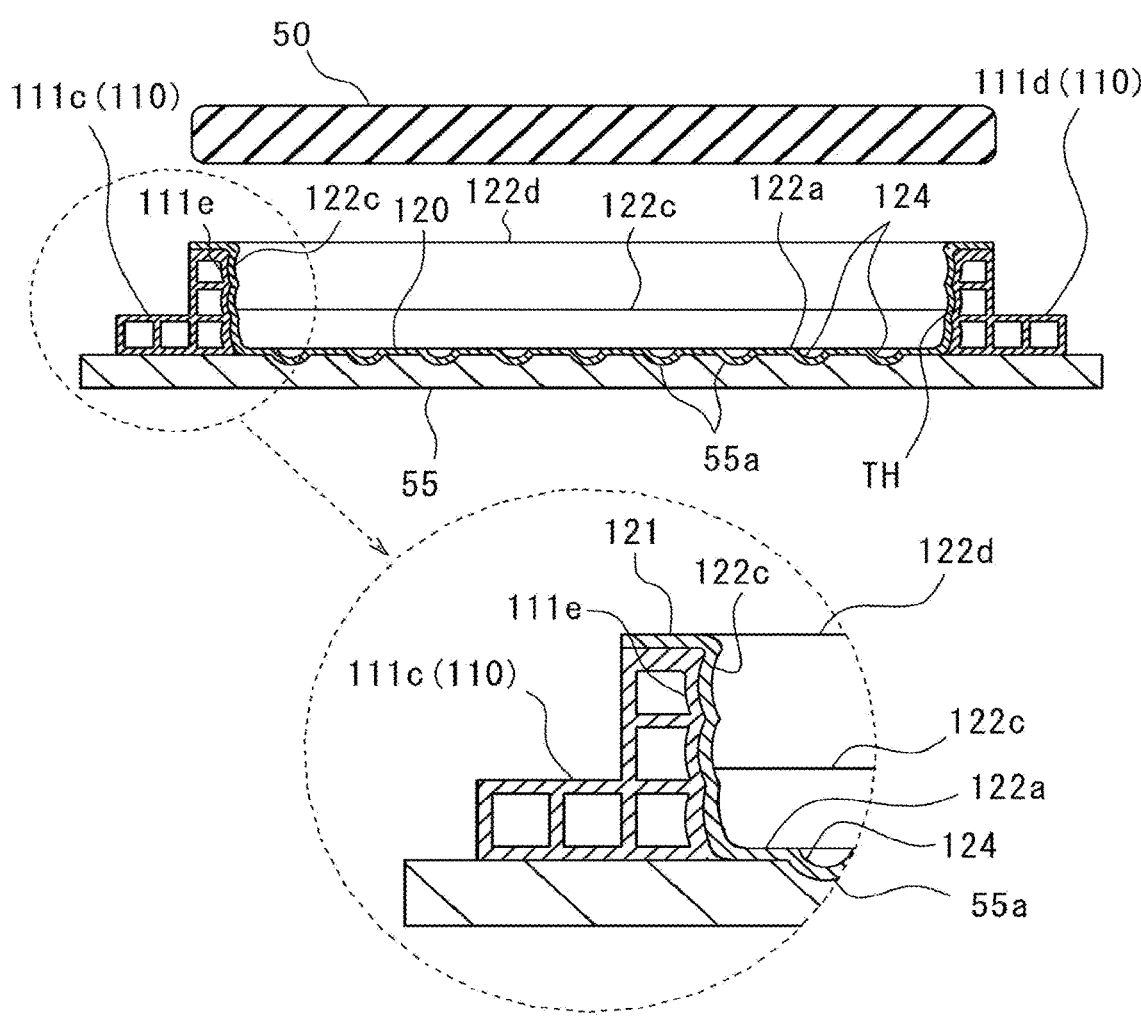
FIG. 8 is a third cross-sectional view illustrating the method for manufacturing the battery case according to the first embodiment.

Next, referring to FIGS. 7 and 8, the blank material 120 is pressurized and pressed against the frame 110 to bulge the blank material 120 into the through hole (space) TH of the frame 110. Thus, the blank material 120 is deformed into the bathtub-shaped tray 120, and the blank material 120 (i.e., the tray 120) is pressure-welded to the frame 110. As a result, the tray 120 and the frame 110 are integrated.

In the present embodiment, the blank material 120 is pressurized by a pressure molding method (rubber bulge method) that uses an elastic body. The pressure molding method refers to a method for molding a member with a gas or liquid pressure. In the present embodiment, the rubber bulge method uses a hydraulic pressure transfer elastic body 50 that can be elastically deformed using a liquid pressure is used. The hydraulic pressure transfer elastic body 50 may adopt a structure that only a lower surface of a metal chamber containing a liquid such as water or oil is blocked with a rubber plate. According to this hydraulic pressure transfer elastic body 50, the rubber plate is elastically deformed by adjusting the liquid pressure, so that it is possible to mold the blank material 120 without the liquid coming into direct contact with the blank material 120.

Referring to FIGS. 6 and 7, in the present embodiment, the frame 110, the blank material 120, and the hydraulic pressure transfer elastic body 50 are overlaid and disposed on the table 55 in this order, and the blank material 120 is pressurized and pressed against the frame 110 via the hydraulic pressure transfer elastic body 50. Preferably, the blank material 120 is pressurized by the rubber bulge method in a state where the blank material 120 is heated and softened. In this case, the blank material 120 is softened, so that it is possible to further suppress cracking of the tray 120 at a time of molding.

Figure 5:
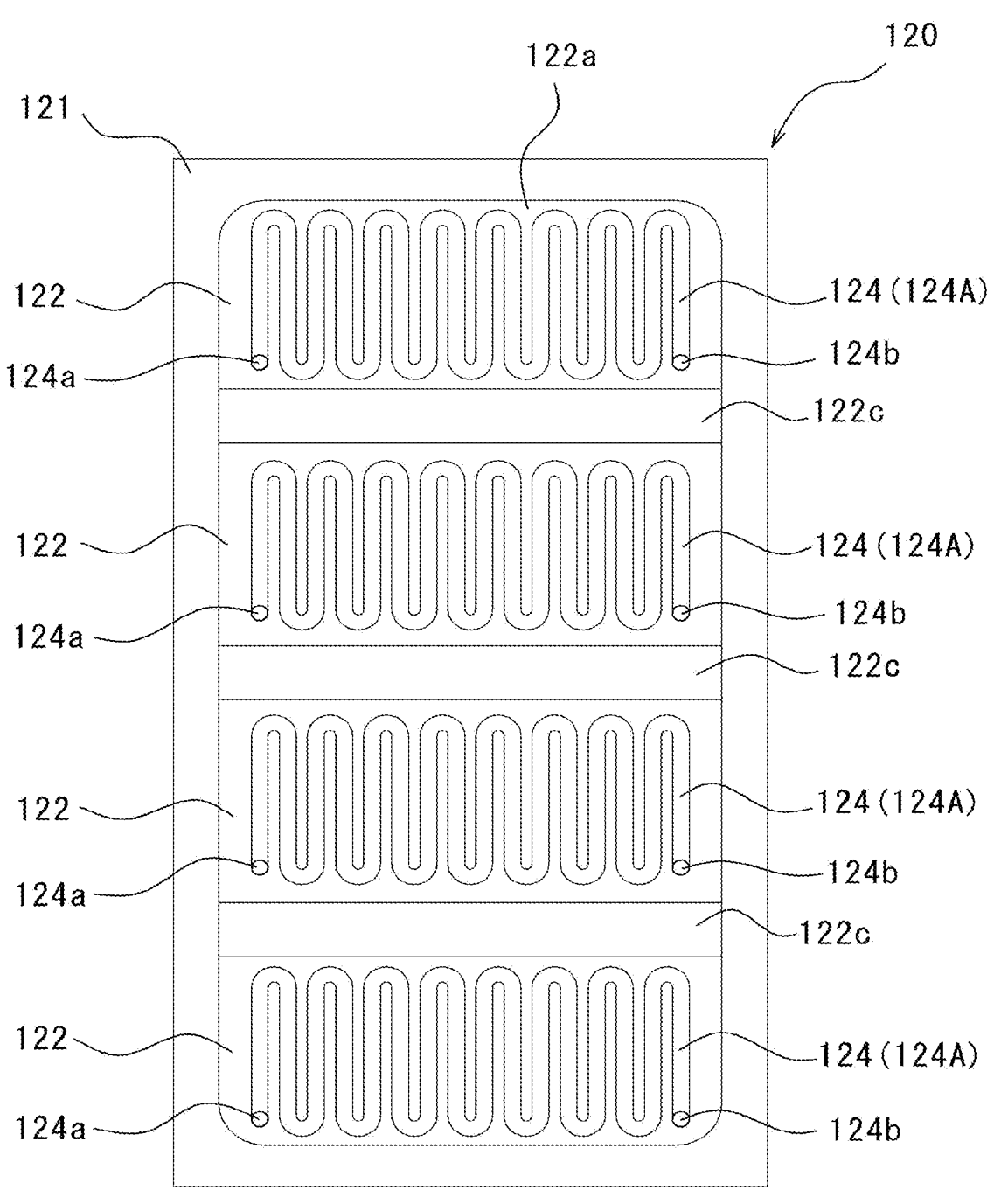
FIG. 5 is a plan view of the tray according to the first embodiment.
Figure 9:
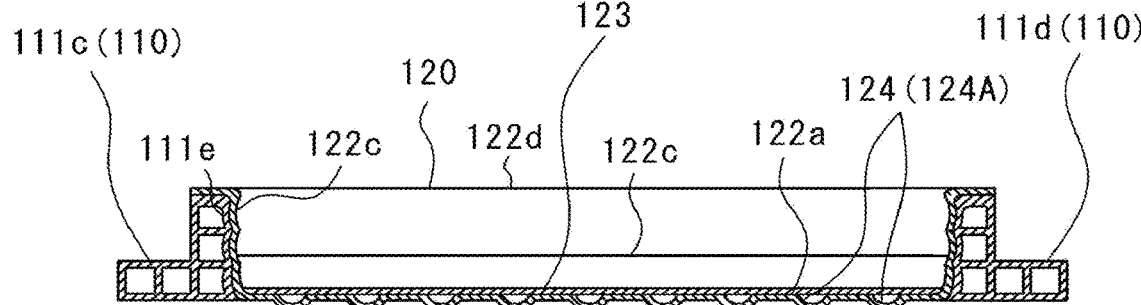
FIG. 9 is a fourth cross-sectional view illustrating the method for manufacturing the battery case according to the first embodiment.

Furthermore, the recess parts 55*a* having the shapes matching the grooves 124 are formed in an upper surface of the table 55 to make it possible to mold the grooves 124 in the tray 120. Therefore, accompanying pressurization by the hydraulic pressure transfer elastic body 50, the grooves 124 (see FIG. 8) are molded in the bottom wall 122*a* of the tray 120. That is, in the present embodiment, the blank material 120 is molded into the bathtub-shaped tray 120, and the grooves 124 are molded in the bottom wall 122*a* of the housing part 122 of the tray 120. The shape of the groove 124 in plan view is not limited in particular, and may be, for example, the bellows shape as illustrated in FIG. 5. Furthermore, a cross-sectional shape of the groove 124 is also not limited in particular, and may be a semicircular shape as illustrated in FIGS. 8 and 9. Furthermore, although not illustrated in detail, in addition to molding of the grooves 124, projections for positioning the battery 30 may be molded on the tray 120.

Referring to FIG. 8, when a pressurizing force is released after the blank material 120 is deformed into the bathtub-shaped tray 120, the hydraulic pressure transfer elastic body 50 is restored to a shape in a natural state. Consequently, it is possible to easily remove the hydraulic pressure transfer elastic body 50 from the inside of the tray 120. After the hydraulic pressure transfer elastic body 50 is removed, the top cover 130 and the under cover 140 are joined to form the battery case 100 as illustrated in FIG. 2.

In the present embodiment, thicknesses of upper parts of the front wall 111*a*, the rear wall 111*b*, and the sidewalls 111*c* and 111*d* of the frame 110 are set to be thicker than other parts. The upper parts of the front wall 111*a*, the rear wall 111*b*, and the sidewalls 111*c* and 111*d* are parts that are susceptible to a force due to the above molding, and the thicknesses of the parts are increased to prevent unintended deformation. Furthermore, R shapes are provided to inner upper parts of the front wall 111*a*, the rear wall 111*b*, and the sidewalls 111*c* and 111*d*. These R shapes promote an inflow of the material into the inside of the blank material 120 during the above molding. In this regard, from a viewpoint of design of the extruded material or the like, small angles R (fillet R) are provided to other than the inner upper part of the frame 110 in some cases. In the drawings, these small angles R are omitted.

In the present embodiment, referring to FIG. 8, when the blank material 120 is molded into the bathtub-shaped tray 120, negative angle forming for forming a negative angle at least partially from the bottom wall 122*a* toward the opening part 122*d* of the tray 120 above is performed. In this regard, the negative angle is a term often used in a field of molding that uses a mold, and indicates that a mold draft angle of a molding member is less than zero (minus). In the present embodiment, negative angle forming is performed in such a way that pressurization of the hydraulic pressure transfer elastic body 50 integrally deforms the frame 110 and the blank material 120 having no negative angle part in advance to form a negative angle. In the illustrated example, the inner surface of the frame 110 is deformed outward per compartment, and the blank material 120 is also deformed outward along with the deformed inner surface to form negative angle parts 111*e* and 122*c*. FIG. 8 illustrates an enlarged area encircled by a broken line circle to more clearly illustrate the negative angle parts 111*e* and 122*c*.

Next, referring to FIG. 9, the closing plate 123 is disposed on and joined to the bottom wall 122*a* of the tray 120 to close the grooves 124 molded as described above. The closing plate 123 is disposed on the housing part 122 of the tray 120 from above, and is joined by, for example, FSW. The closing plate 123 and the groove 124 define the coolant flow path 124A through which the coolant flows.

Figure 10:
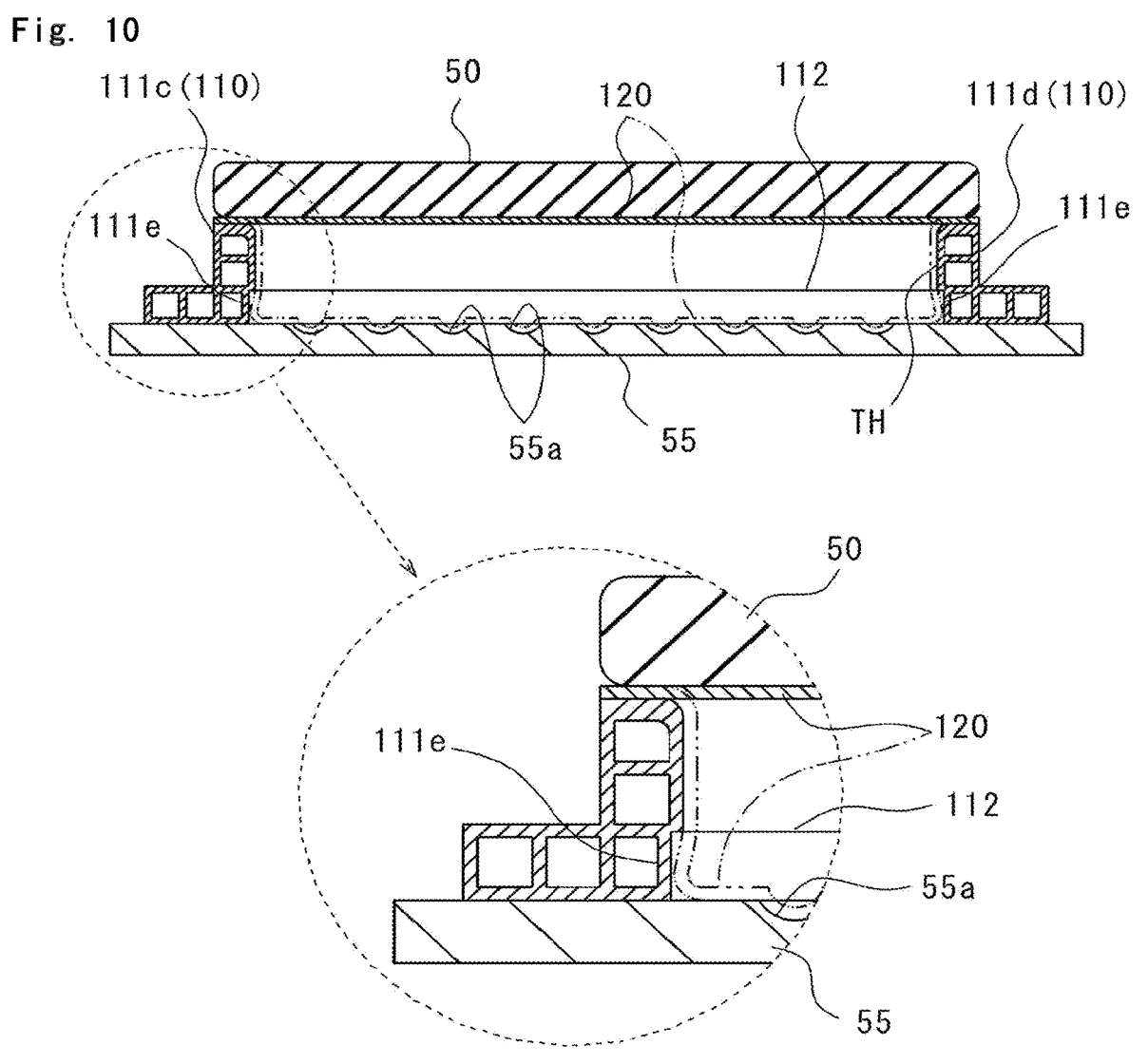
Figure 11:
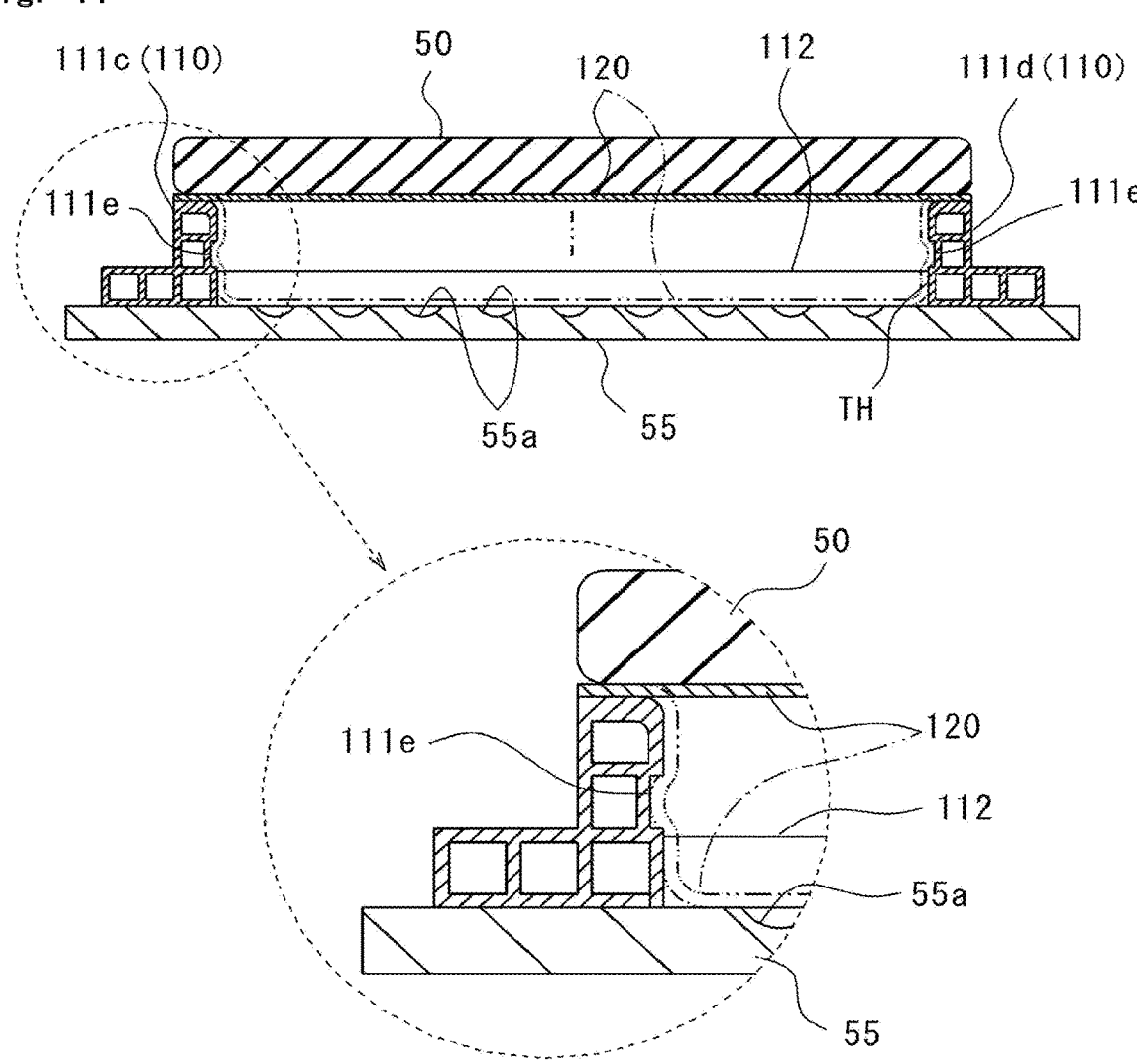
FIG. 11 is a cross-sectional view illustrating a second modified example of negative angle forming.
Figure 12:
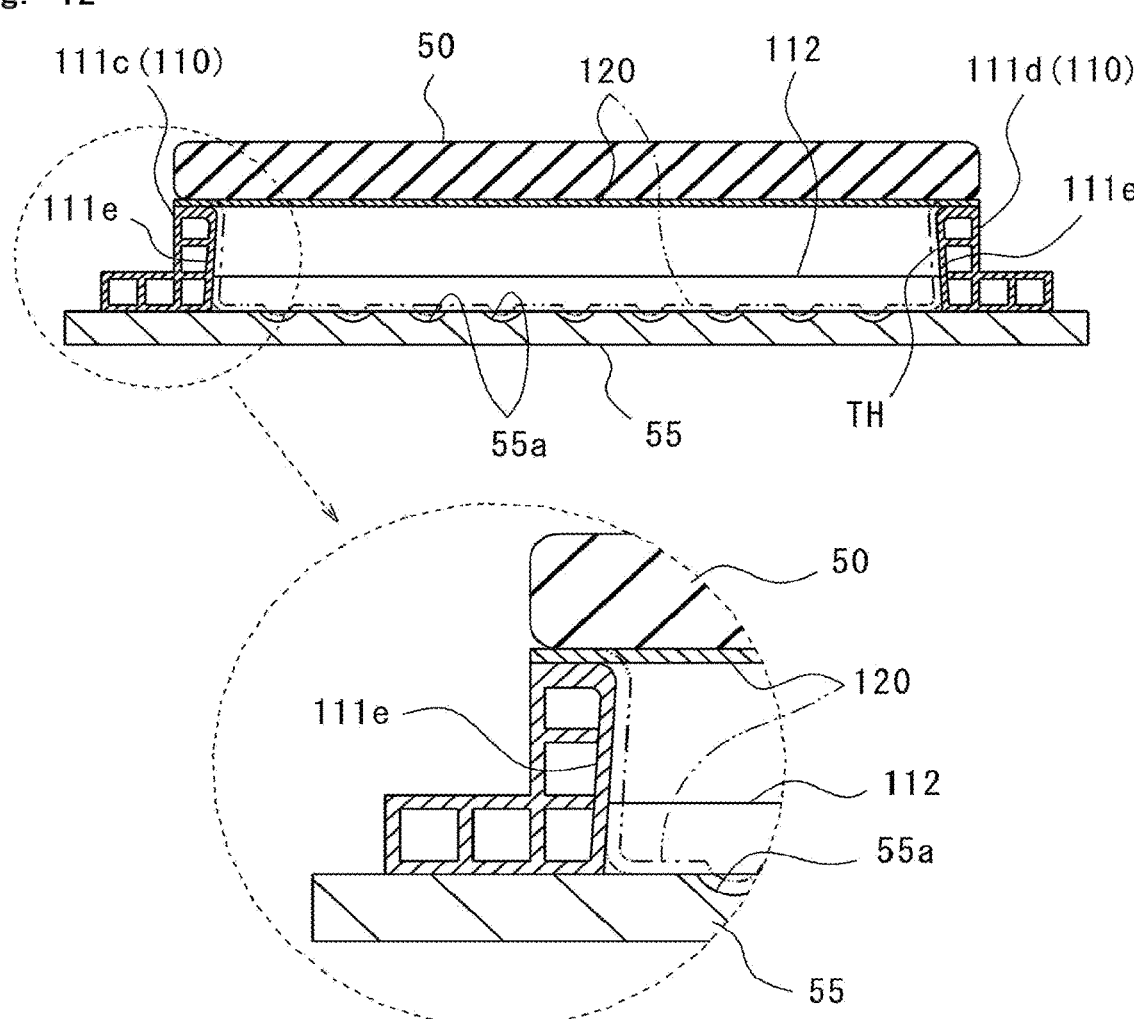
FIG. 12 is a cross-sectional view illustrating a third modified example of negative angle forming.

Furthermore, as illustrated in FIGS. 10 to 12 as a modified example of negative angle forming, the negative angle part 111*e* may be provided to the frame 110 in advance. In this case, negative angle forming is performed by pressing the blank material 120 against the negative angle part 111*e* of the frame 110. In the example in FIG. 10, the negative angle part 111*e* is formed as a dent in an inner surface of a lower part in a vehicle height direction of the frame 110. In the example in FIG. 11, the negative angle part 111*e* is formed as a dent on an inner surface of a center part in the vehicle height direction of the frame 110. In the example of FIG. 12, the inner surface of the frame 110 is inclined toward the center of the frame 110 to form the negative angle part 111*e* as an inclined surface. Furthermore, the negative angle parts 111*e* may also be formed at the cross members 112. As described above, by providing the negative angle parts 111*e* to the frame 110 in advance, it is possible to easily and reliably execute negative angle forming for providing the negative angle parts to the battery case 100.

Figure 13:
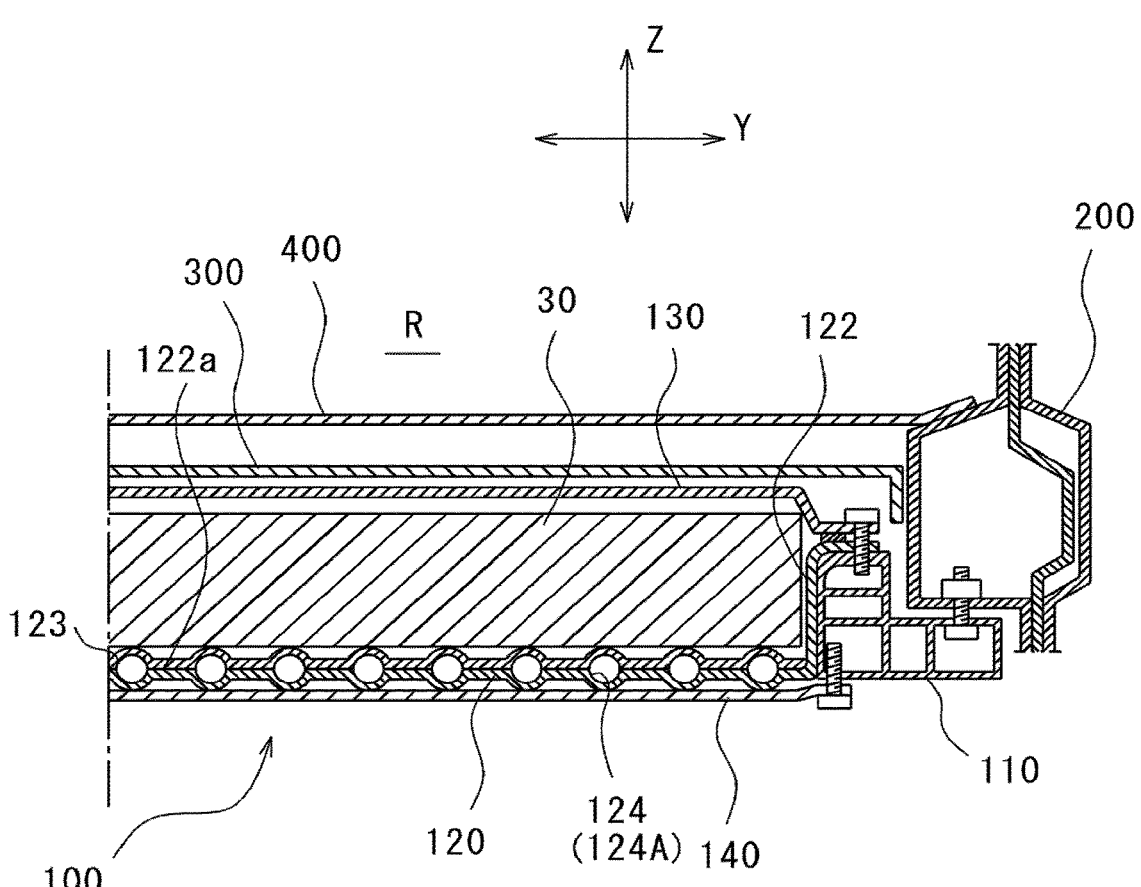
FIG. 13 is a schematic cross-sectional view of a battery case illustrating a modified example of a closing plate.

Furthermore, as illustrated in FIG. 13 as a modified example of the closing plate 123, a recess/protrusion shape may be provided to the closing plate 123. Although the above-described configuration exemplifies the closing plate 123 having the flat surface, an upward protrusion shape (downward recess shape) may be provided to the closing plate 123 to match with the shape of the groove 124 so as to expand a flow path area of the coolant flow path 124A. In the example of FIG. 13, a semicircular shape vertically symmetrical to the semicircular shape of the groove 124 is provided to the closing plate 123. In this way, by expanding the flow path area of the coolant flow path 124A, it is possible to increase the flow rate of the coolant, and improve the cooling performance.

The above battery case 100 and the method for manufacturing the battery case 100 provide following functions and effects.

According to the present embodiment, the tray 120 is molded into the bathtub shape, so that there is no seam, and a high sealing property can be secured. Furthermore, the R shapes are provided to the corner parts of the frame 110 by the corner members 113, the tray 120 is pressure-welded to the frame 110, and therefore the R shapes of the corner members 113 of the frame 110 are provided to the tray 120, too. Consequently, it is possible to form the tray 120 having the R shapes matching the R shapes of corner members 113. Consequently, it is possible to improve space efficiency for mounting the battery 30 by setting the R shapes of the corner members 113 to a desired size. In a case where the corner members 113 are not used and the R shapes are not provided to the corner parts of the frame 110, the R shapes of the corner parts of the tray 120 become significantly small due to high-load press molding, and, as a result, there is a risk that the tray 120 is cracked. However, in a case where the R shapes are provided to the corner parts of the frame 110 by the corner members 113 as in the present embodiment, the tray 120 is provided with at least the same R shapes as the R shapes of the corner members 113 of the frame 110, so that it is possible to suppress the crack of the bottom surface part and the wrinkle of the flange part produced at a time of molding of the tray 120. Furthermore, the bathtub-shaped tray 120 is pressure-welded to and thereby integrated with the frame 110, so that it is possible to realize highly accurate joining without causing thermal deformation accompanying welding, that is, it is possible to improve the joining strength of the tray 120 and the frame 110.

Furthermore, the frame 110 includes the main body 111 and the corner member 113 as separate bodies, so that it is easy to freely set the R shapes of the corner parts of the frame 110.

Furthermore, the negative angle parts are formed in the tray 120, so that it is possible to suppress the pressure-welding from being released and the tray 120 from coming out of the frame 110.

Furthermore, it is possible to cool the battery 30 by causing the coolant to flow through the coolant flow path 124A. In a case of the battery case 100 having a high sealing property as in the present embodiment in particular, heat dissipation performance could lower, and therefore is required to have high cooling performance.

Furthermore, the present embodiment adopts the rubber bulge method, so that it is possible to easily mold the blank material 120 into the bathtub-shaped tray 120 without being accompanied by thermal deformation.

Furthermore, the corner member 113 may be detached from the frame 110 after the tray 120 and the frame 110 are integrated. Accordingly, it is possible to reduce the weight.

Modified Example

Figure 14:
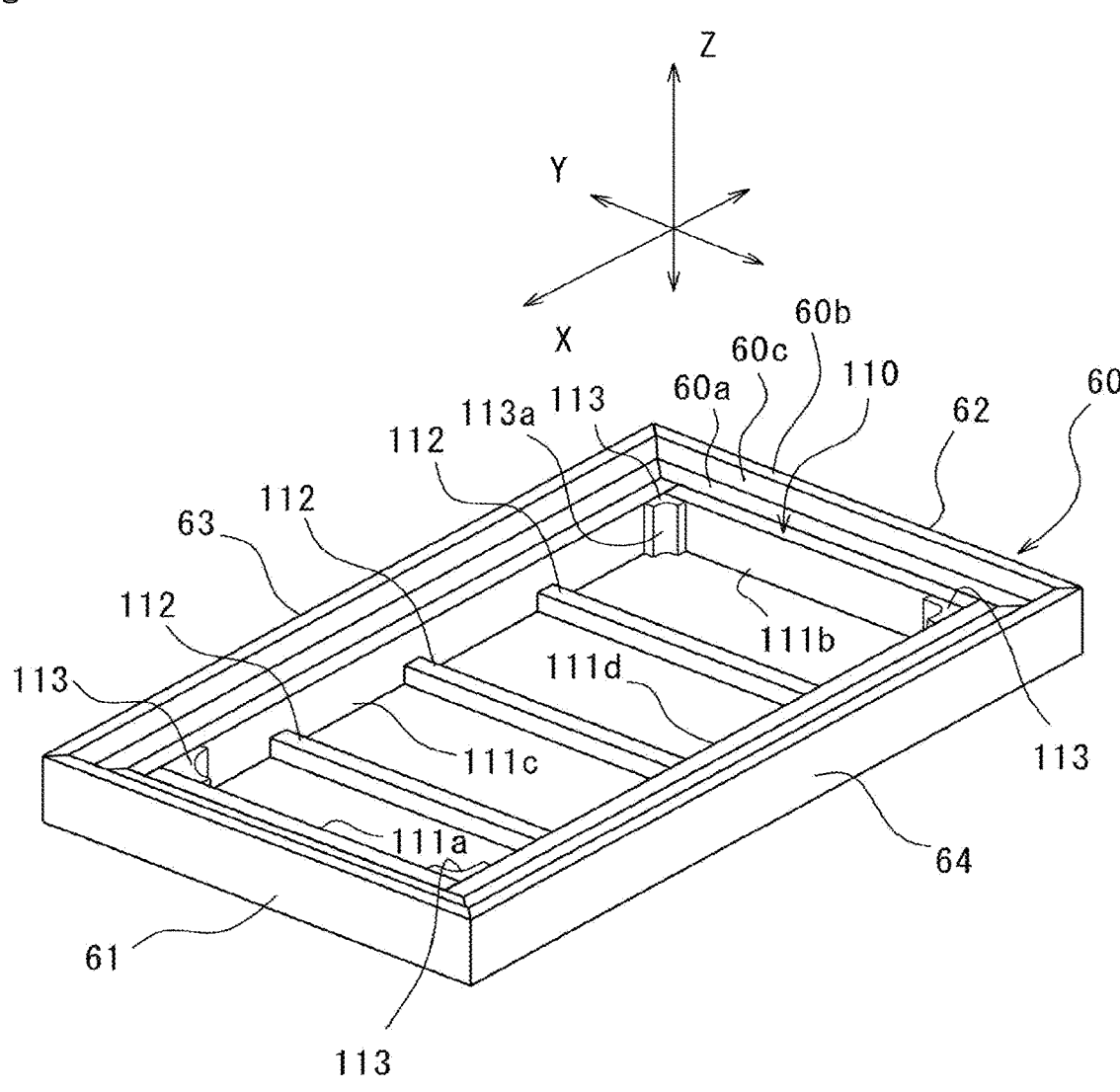
FIG. 14 is a perspective view of a restraining die and a frame.
Figure 15:
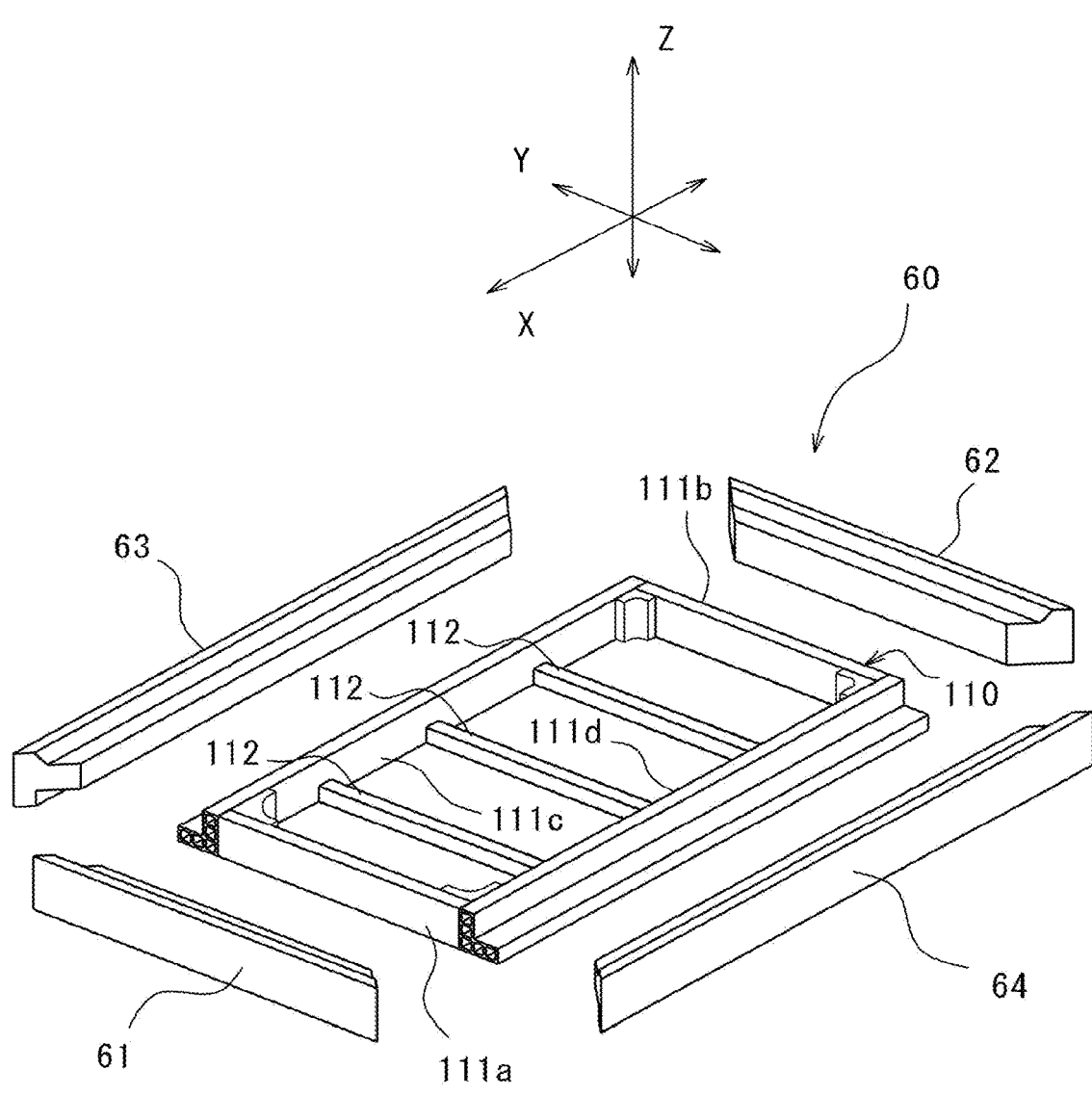
FIG. 15 is an exploded perspective view of the restraining die and the frame.

A modified example of the above embodiment will be described with reference to FIGS. 14 and 15. In this modified example, a restraining die 60 that restrains movement of a frame 110 is used.

The restraining die 60 has a shape fitting mutually with that of the frame 110, and is disposed on an outer side of the frame 110 in plan view. The restraining die 60 includes a front restraining member 61 and a rear restraining member 62 that support a front wall 111a and a rear wall 111b, respectively, and side restraining members 63 and 64 that support sidewalls 111c and 111d, respectively. The front restraining member 61, the rear restraining member 62, and the side restraining members 63 and 64 are combined to form a frame shape in plan view. An upper surface of the restraining die 60 is formed to have a two-step shape. Specifically, the upper surface of the restraining die 60 includes a first surface 60a that is aligned at substantially the same height as that of the upper surface of the frame 110, and a second surface 60b that is provided one step higher than the upper surface of the frame 110. The first surface 60a and the second surface 60b are connected by an inclined surface 60c, and the second surface 60b is disposed on an outer side of the first surface 60a in plan view. Furthermore, lower surfaces of the frame 110 and the restraining die 60 are aligned. Therefore, upon comparison of height dimensions of the frame 110 and the restraining die 60, the height of the restraining die 60 is set higher than the height of the frame 110.

Figure 16:
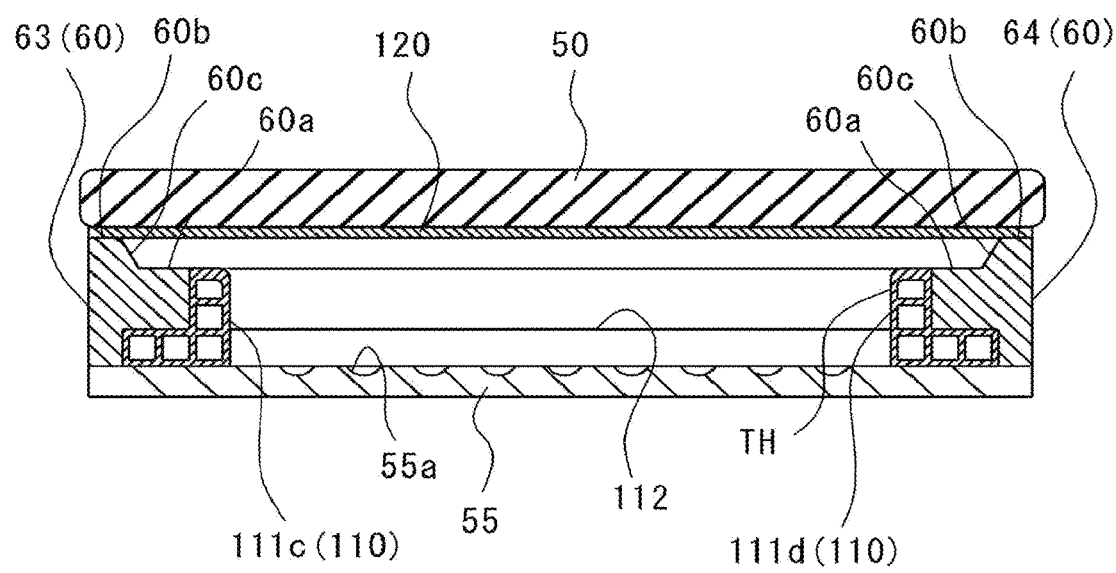
FIG. 16 is a first cross-sectional view illustrating a method for manufacturing a battery case according to the modified example.
Figure 17:
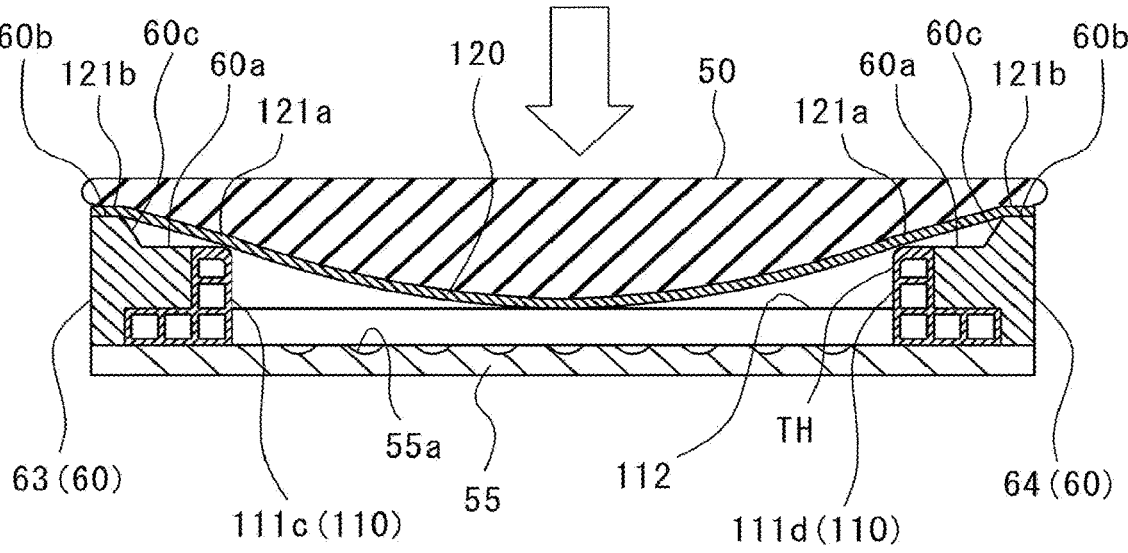
FIG. 17 is a second cross-sectional view illustrating the method for manufacturing the battery case according to the modified example.
Figure 18:
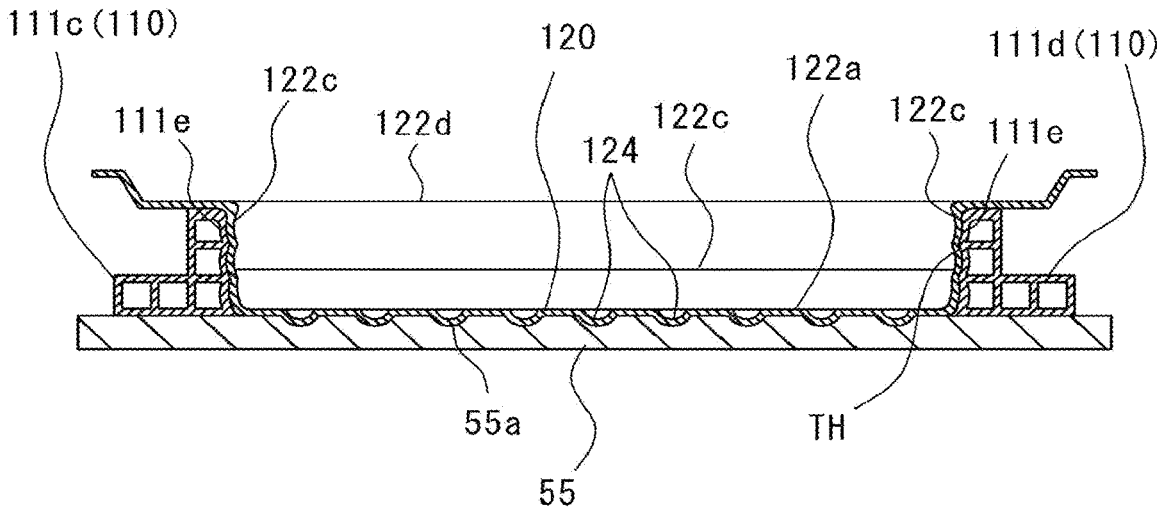
FIG. 18 is a third cross-sectional view illustrating the method for manufacturing the battery case according to the modified example.

A method for manufacturing a battery case 100 according to the present embodiment further prepares the restraining die 60 that restrains the movement of the frame 110, and fixes and disposes the restraining die 60 on the outer side of the frame 110 in plan view (see FIGS. 14 and 15) in addition to the first embodiment. Subsequently, as illustrated in FIGS. 16 to 18, a blank material 120 is deformed into a bathtub-shaped tray 120 and integrated with the frame 110 in the same manner as described above. At the same time, grooves 124 are formed in bottom part 122a of a placement part 122 of the tray 120. Furthermore, as illustrated in FIG. 19, closing plates 123 are disposed on and joined to the tray 120.

Specifically, as illustrated in FIG. 16, the blank material 120 is disposed on the restraining die 60, and, as illustrated in FIG. 17, the blank material 120 is pressurized via a hydraulic pressure transfer elastic body 50 such that a first outer edge part 121a of the blank material 120 is supported by the frame 110, and a second outer edge part 121b (outermost edge part) on an outer side of the first outer edge part 121a (a part on an inner side slightly from the outermost edge part) is supported by the second surface 60b of the restraining die 60. As a result, the blank material 120 is deflected and disposed such that the height becomes lower from the outer side toward the inner side, and the blank material 120 is pressurized continuously in the state where the blank material 120 is deflected in this way to deform the blank material 120 into the bathtub-shaped tray 120 including the grooves 124 formed in the bottom wall 122a, and pressure-weld the tray 120 with the frame 110 (see FIG. 18).

Figure 19:
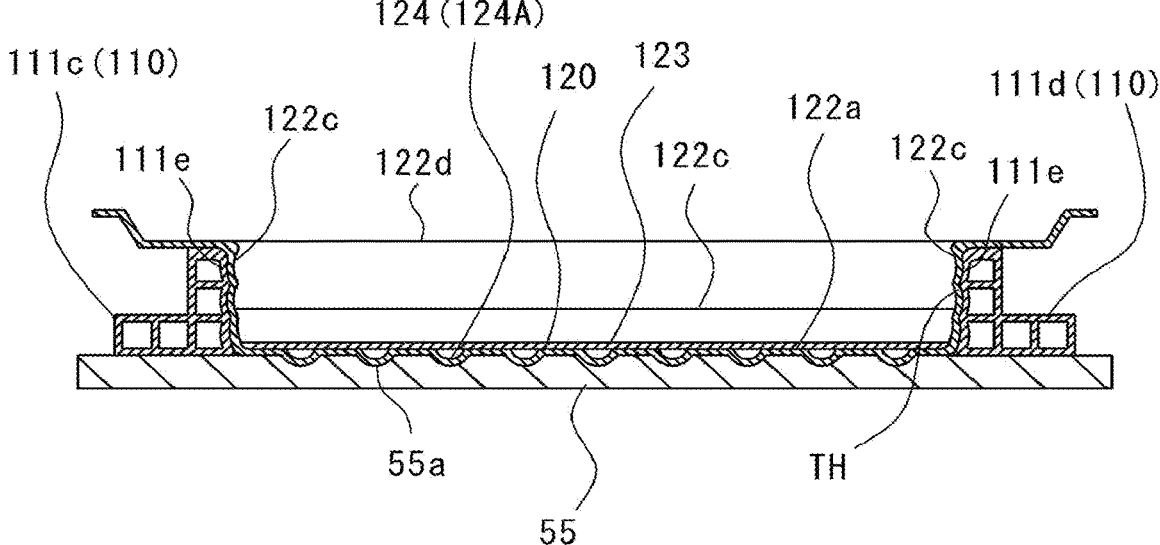
FIG. 19 is a fourth cross-sectional view illustrating the method for manufacturing the battery case according to the modified example.

After the above pressure-welding, the closing plates 123 are disposed on and joined to the bottom wall 122a of the tray 120 to close the grooves 124 as illustrated in FIG. 19. The closing plate 123 is disposed on the bottom wall 122a of the housing part 122 of the tray 120 from above, and is joined by, for example, FSW. In this way, the closing plate 123 and the groove 124 define a coolant flow path 124A.

According to the present embodiment, the blank material 120 is pressurized in a state where the blank material 120 is deflected such that the height becomes lower from the outer side toward the inner side, so that it is possible to increase the amount of the material flowing into the inside of the blank material 120, and further reduce the roundness of the ridge part of the bottom part 122a or the corner parts of the tray 120.

In this modified example, the inclined surface 60c may extend in a vertical direction, or may have a negative angle shape. Furthermore, shoulder R shapes (fillet shapes of the inclined surface 60c and the second surface 60b) of the restraining die 60 are not illustrated, yet the shoulder R shapes are preferably provided. Furthermore, the first surface 60a may be omitted.

Figure 20:
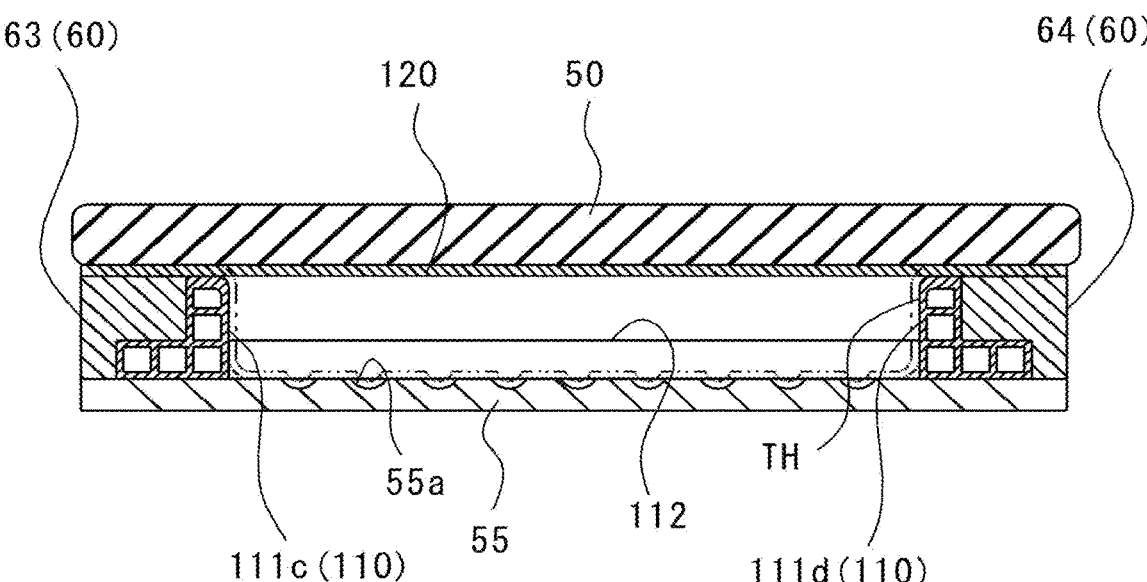
FIG. 20 is a cross-sectional view illustrating a modified example of the method for manufacturing the battery case according to another modified example.

Alternatively, as illustrated in FIG. 20, the height dimensions of the frame 110 and the restraining die 60 may be the same. In the examples in FIGS. 14 to 19, the height dimension of the restraining die 60 is made larger than that of the frame 110 to increase the amount of material flowing into the inside of the blank material 120. However, in a case where there is no problem in molding the tray 120, the upper surface of the frame 110 and the upper surface of the restraining die 60 may be aligned for a purpose of improving a material yield as illustrated in FIG. 20.

Second Embodiment

Figure 21:
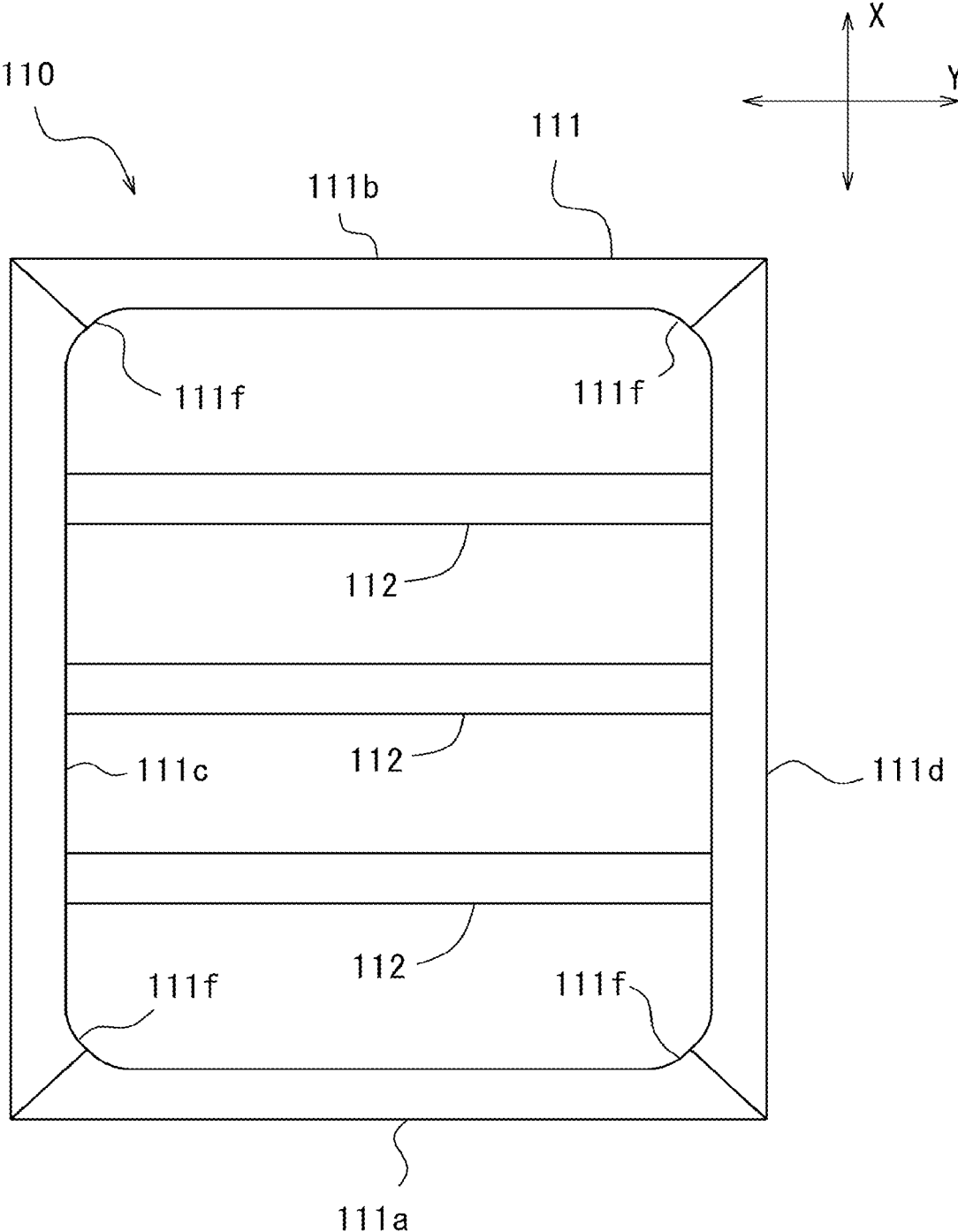
FIG. 21 is a plan view of a frame of a battery case according to a second embodiment.

Referring to FIG. 21, in the second embodiment, a frame 110 does not include corner members 113 (see FIG. 4), and is provided with R parts 111f formed by providing R shapes to inner sides of corner parts of a main body 111. The second embodiment is substantially the same as the first embodiment except for the above. Therefore, description of the same parts as those of the first embodiment will be omitted in some cases.

A front wall 111a, a rear wall 111b, a sidewall 111c, and a sidewall 111d of the frame 110 are composed of an extruded material made of an aluminum alloy. In plan view, the front wall 111*a* and the sidewall 111*c*, and the front wall 111*a* and the sidewall 111*d* are respectively welded, and the rear wall 111*b* and the sidewall 111*c*, and the rear wall 111*b* and the sidewall 111*d* are respectively welded. In this way, a rectangular frame shape of the frame 110 in plan view is formed. Inner sides of both end parts of each of the walls 111*a* to 111*d* are subjected to press work to form the R parts 111*f*.

Figure 22:
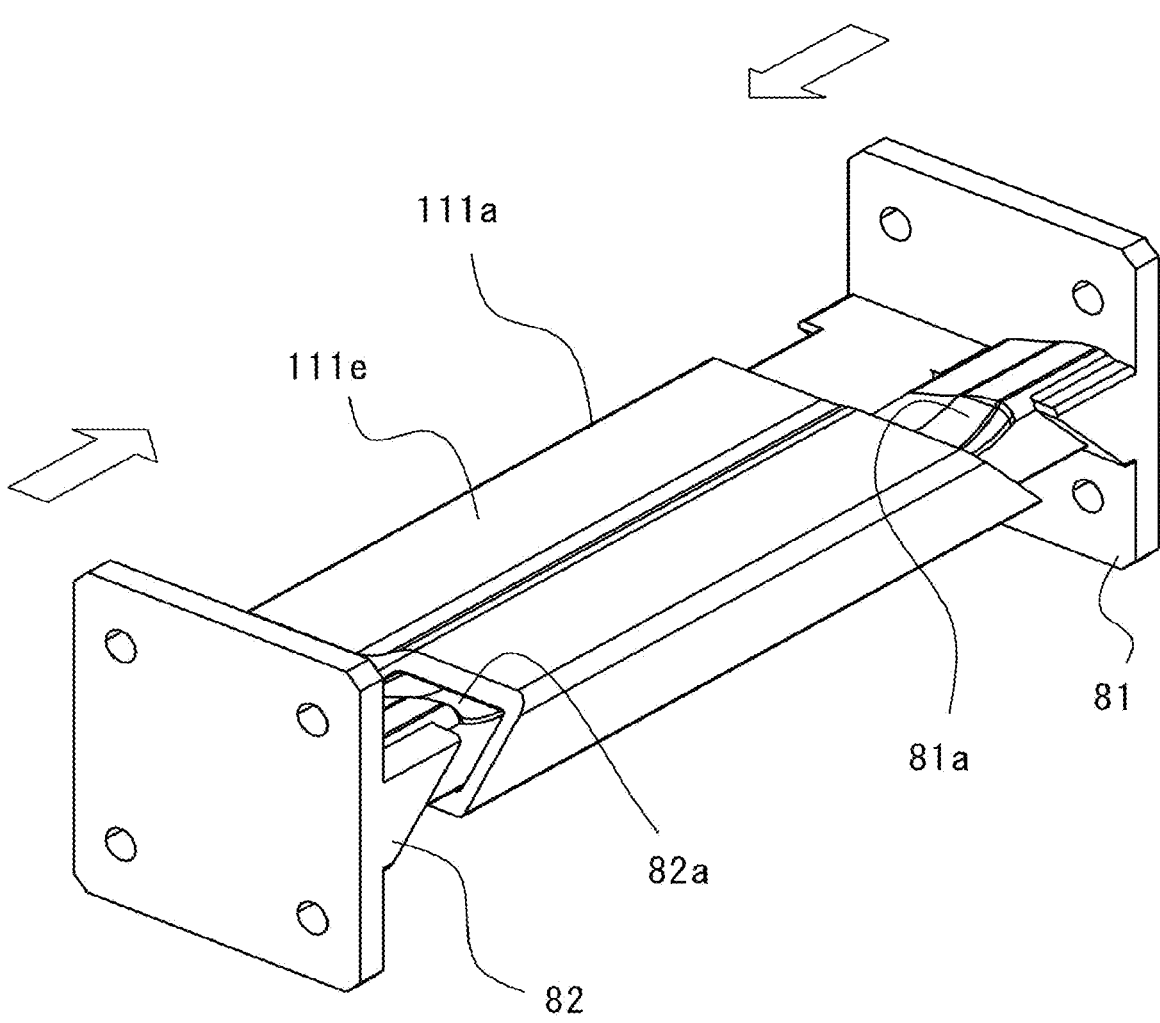
FIG. 22 is a perspective view illustrating a method for manufacturing the frame in FIG. 21.

FIG. 22 is a perspective view illustrating a method for manufacturing the frame 110 in FIG. 21. FIG. 22 illustrates the front wall 111*a* that makes up the frame 110. The front wall 111*a* in FIG. 22 is formed by cutting a hollow extruded material made of an aluminum alloy diagonally (at, for example, 45°) with respect to a longitudinal direction. By inserting molding jigs 81 and 82 having outer shape slightly larger than the inner shape from the both end parts of the front wall 111*a*, the both end parts are enlarged and deformed, and the R shapes are formed. In particular, the molding jigs 81 and 82 include, at the parts to be inserted into the front wall 111*a*, curved surfaces 81*a* and 82*a* matching the R shapes to provide the R shapes to the front wall 111*a*. By welding the front wall 111*a* molded in this way and the rear wall 111*b* and the sidewalls 111*c* and 111*d* molded likewise to form a frame shape as illustrated in FIG. 21, the frame 110 having the R parts 111*f* is formed.

According to the present embodiment, the frame 110 includes the R parts 111*f*, that is, the frame 110 itself is provided with the R shapes, so that it is not necessary to provide a part for providing the R shapes. Consequently, it is possible to reduce the number of components.

Although the specific embodiments and the modified examples of the present invention have been described above, the present invention is not limited to the above embodiments, and can be variously changed within the scope of the present invention. For example, an appropriate combination of the contents of the individual embodiments or modified examples may be an embodiment of the present invention.

Furthermore, although the above embodiment has exemplified the frame 110 having the rectangular shape in plan view, the frame 110 may have a polygonal shape other than the rectangular shape. The shape of the frame 110 is appropriately designed according to an electric vehicle 1 on which a battery case 100 is mounted.

Figure 23:
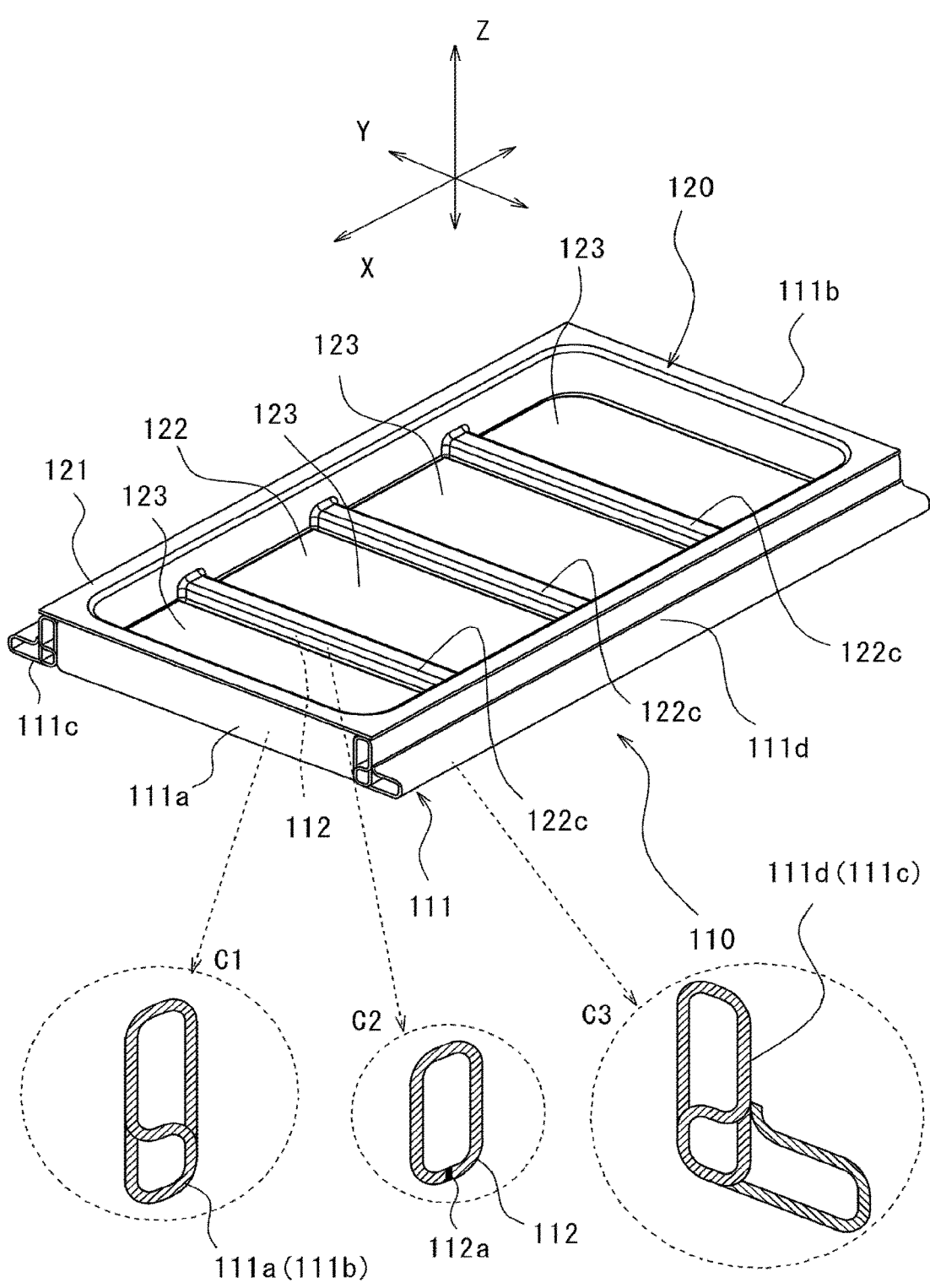
FIG. 23 is a perspective view of the battery case including a frame composed of a steel plate roll forming material and a cross member.

Furthermore, materials of the frame 110 and a tray 120 are not limited to those of the above embodiments. For example, the frame 110 may be composed of a steel plate roll forming material (see FIG. 23), and the tray 120 may be composed of a plate material made of steel. For example, the frame 110 may be composed of a steel plate roll forming material that is subjected to an anti-corrosive coating (see FIG. 23), and the tray 120 may be composed of a plate material made of an aluminum alloy. For example, the frame 110 may be composed of an extruded material made of an aluminum alloy, and the tray 120 may be composed of a coated steel plate or a laminated (resin laminated) steel plate.

Furthermore, the above embodiments have described the examples where molding of the tray and integration of the frame 110 and the tray 120 are performed by the rubber bulge method in one process, molding and integration may be performed at two stages by changing conditions such as a press load. That is, the blank material 120 may be molded into the substantially bathtub-shaped tray 120 including a surrounding wall 122*b* of a large inclination angle or the like by cold pressing at a first stage, and may be molded into a more accurate tray 120 shape by the rubber bulge method, and the frame 110 and the tray (blank material) 120 may be pressure-welded and integrated at the second stage. By separately performing pressurization of the blank material 120 at two stages in this way, a position where a strain increases in the blank material 120 changes, so that it is possible to improve moldability as a whole. That is, it is possible to suppress cracking of the blank material 120, and stably mold the tray.

Furthermore, although the above embodiments have exemplified the configurations where grooves 124 are formed in an upper surface of a bottom wall 122*a*, and the grooves 124 are covered with the closing plates 123 from above, there may be employed a configuration where the grooves 124 are formed in a lower surface of the bottom wall 122*a*, and the grooves 124 are covered with the closing plates 123 from below.

The invention claimed is:

1. A battery case for an electric vehicle comprising:
   a frame that has a polygonal frame shape in plan view, defines a space inside, and has an R shape provided to an inner side of a corner part of the polygonal frame shape; and
   a tray of a bathtub shape that includes a bottom wall that is located in the space, a surrounding wall that is provided around the bottom wall and defines an opening part on a side opposite to the bottom wall, and a flange that is provided at a distal end of the surrounding wall, and is pressure-welded to and integrated with the frame,
   wherein the tray includes a negative angle part that has a negative angle directed at least partially inward from the bottom wall toward the opening part of the tray.

2. The battery case for the electric vehicle according to claim 1, wherein the frame includes a main body that forms the polygonal frame shape, and a corner member that has the R shape disposed on the inner side of the corner part of the main body.

3. The battery case for the electric vehicle according to claim 1, wherein
   the polygonal frame shape of the frame is formed by welding a linear extruded material, and
   an end part of the extruded material is subjected to press work so as to have the R shape.

4. The battery case for the electric vehicle according to claim 1, wherein
   the frame is composed of an extruded material made of an aluminum alloy, and
   the tray is composed of a plate material made of an aluminum alloy.

5. The battery case for the electric vehicle according to claim 1, wherein
   the frame is composed of a steel plate roll forming material, and
   the tray is composed of a plate material made of steel.

6. The battery case for the electric vehicle according to claim 1, wherein
   the frame is composed of a steel plate roll forming material that is subjected to an anti-corrosive coating, and
   the tray is composed of a plate material made of an aluminum alloy.

7. The battery case for the electric vehicle according to claim 1, wherein
   the frame is composed of an extruded material made of an aluminum alloy, and
   the tray is composed of a coated steel plate or a laminated steel plate.

8. The battery case for the electric vehicle according to claim 1, wherein the frame includes a cross member.

9. The battery case for the electric vehicle according to claim 1, wherein a flow path of a coolant is molded in the bottom wall of the tray.

10. A method for manufacturing a battery case for an electric vehicle, the method comprising:

preparing a frame and a molding target member having a flat plate shape, the frame including a main body that has a polygonal frame shape in plan view and defines a space inside, and a corner member that is disposed on an inner side of a corner part of the main body, and has an R shape;

overlaying and disposing the molding target member on the frame;

pressurizing the molding target member from a side opposite to the frame, pressing the molding target member against the frame, and bulging the molding target member in the space, thus deforming the molding target member into a tray of a bathtub shape, and integrating the molding target member with the frame, the tray including a bottom wall, and a surrounding wall that is provided at a circumferential edge of the bottom wall and defines an opening part; and detaching the corner member from the frame after the molding target member and the frame are integrated.

11. The method for manufacturing the battery case for the electric vehicle according to claim 10, wherein the molding target member is pressurized by a rubber bulge method.

12. The method for manufacturing the battery case for the electric vehicle according to claim 11, wherein the molding target member is pressurized by the rubber bulge method in a state where the molding target member is heated and softened.

13. The method for manufacturing the battery case for the electric vehicle according to claim 10, the method further comprising:

further preparing a restraining die having a height dimension equal to or larger than a height dimension of the frame and that restrains movement of the frame;

fixing and disposing the restraining die on an outer side of the frame;

supporting a first outer edge part of the molding target member by the frame, supporting a second outer edge part on an outer side of the first outer edge part by the restraining die, and thus deflecting and disposing the molding target member such that a height of the molding target member becomes lower from an outer side to an inner side in plan view; and pressurizing the molding target member in a state where the molding target member is deflected.

14. The method for manufacturing the battery case for the electric vehicle according to claim 10, wherein the molding target member is pressurized at two stages, the molding target member is molded into a bathtub shape at a first stage, and the frame and the molding target member are pressure-welded and integrated at a second stage.

15. The battery case for the electric vehicle according to claim 1, wherein a flow path of a coolant is molded in the bottom wall of the tray.

16. The method for manufacturing the battery case for the electric vehicle according to claim 11, the method further comprising:

further preparing a restraining die having a height dimension equal to or larger than a height dimension of the frame and that restrains movement of the frame;

fixing and disposing the restraining die on an outer side of the frame;

supporting a first outer edge part of the molding target member by the frame, supporting a second outer edge part on an outer side of the first outer edge part by the restraining die, and thus deflecting and disposing the molding target member such that a height of the molding target member becomes lower from an outer side to an inner side in plan view; and pressurizing the molding target member in a state where the molding target member is deflected.

17. The method for manufacturing the battery case for the electric vehicle according to claim 13, wherein the molding target member is pressurized at two stages, the molding target member is molded into a bathtub shape at a first stage, and the frame and the molding target member are pressure-welded and integrated at a second stage.

* * * * *